(12) United States Patent
Li et al.

(10) Patent No.: US 11,510,083 B2
(45) Date of Patent: Nov. 22, 2022

(54) METHOD AND APPARATUS FOR SENDING DATA VOLUME REPORT

(71) Applicant: HUAWEI TECHNOLOGIES CO., LTD., Guangdong (CN)

(72) Inventors: You Li, Shenzhen (CN); Shitong Yuan, Chengdu (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 16/926,078

(22) Filed: Jul. 10, 2020

(65) Prior Publication Data

US 2020/0344632 A1 Oct. 29, 2020

Related U.S. Application Data

(63) Continuation of application No. PCT/CN2019/071498, filed on Jan. 11, 2019.

(30) Foreign Application Priority Data

Jan. 12, 2018 (CN) .......................... 201810032158.5

(51) Int. Cl.
*H04W 24/10* (2009.01)
*H04W 28/02* (2009.01)
(Continued)

(52) U.S. Cl.
CPC ....... *H04W 24/10* (2013.01); *H04W 28/0252* (2013.01); *H04W 28/0278* (2013.01);
(Continued)

(58) Field of Classification Search
None
See application file for complete search history.

(56) References Cited

U.S. PATENT DOCUMENTS 10,200,910 B1 * 2/2019 Marupaduga ..... H04W 28/0278
2009/0196177 A1 8/2009 Teyeb et al.
(Continued)

FOREIGN PATENT DOCUMENTS

CN 101562894 A 10/2009
CN 101873610 A 10/2010
(Continued)

OTHER PUBLICATIONS

Office Action issued in Chinese Application No. 201810032158.5 dated Nov. 9, 2020, 23 pages (With English Translation).
(Continued)

*Primary Examiner* — Saumit Shah
(74) *Attorney, Agent, or Firm* — Fish & Richardson P.C.

(57) ABSTRACT

This application provides a method for sending a data volume report. The method includes: transmitting, by a first device, a first data volume report to a first access device when a condition for reporting a data volume is satisfied, wherein the first data volume report indicates a first uplink data volume transmitted from the first device and a second uplink data volume transmitted from a second device and received by the first device, and the condition comprises one or more of: (1) a sub-condition that at least one of the first uplink data volume or the second is greater than or equal to a predetermined threshold; (2) a time period that the sub-condition is satisfied is greater than or equal to a predetermined time threshold; (3) an instruction instructing the first device to report at least one of the first uplink data volume or a data volume transmitted from the second device; (4) at least one of a plurality of connections between the first device and the first access device is disconnected; or (5) a connection between the first device and a second access device is disconnected.

14 Claims, 10 Drawing Sheets

(51) Int. Cl.
   *H04W 84/04* (2009.01)
   *H04W 92/04* (2009.01)
(52) U.S. Cl.
   CPC ...... *H04W 28/0289* (2013.01); *H04W 84/047* (2013.01); *H04W 92/04* (2013.01)

(56) References Cited

U.S. PATENT DOCUMENTS

| | | | |
|---|---|---|---|
| 2010/0322144 | A1 | 12/2010 | Lee et al. |
| 2011/0269393 | A1* | 11/2011 | Ostergaard ............. H04B 7/155 455/7 |
| 2012/0236782 | A1 | 9/2012 | Bucknell et al. |
| 2015/0230082 | A1* | 8/2015 | Li ........................ H04W 24/08 370/252 |
| 2016/0088624 | A1 | 3/2016 | Lee et al. |
| 2016/0227574 | A1 | 8/2016 | Raina et al. |
| 2016/0286429 | A1* | 9/2016 | Chen ................. H04W 72/1284 |
| 2017/0094656 | A1* | 3/2017 | Chen .................... H04W 76/14 |
| 2017/0353819 | A1 | 12/2017 | Yin et al. |
| 2020/0015145 | A1* | 1/2020 | Wang ................ H04W 72/0446 |

FOREIGN PATENT DOCUMENTS

| | | | |
|---|---|---|---|
| CN | 102111808 | A | 6/2011 |
| CN | 102149080 | A | 8/2011 |
| CN | 102291772 | A | 12/2011 |
| CN | 102440024 | A | 5/2012 |
| CN | 102598825 | A | 7/2012 |
| CN | 103098507 | A | 5/2013 |
| CN | 103596213 | A | 2/2014 |
| CN | 103781123 | A | 5/2014 |
| CN | 103906258 | A | 7/2014 |
| CN | 104349461 | A | 2/2015 |
| CN | 104702535 | A | 6/2015 |
| CN | 104770048 | A | 7/2015 |
| CN | 104823507 | A | 8/2015 |
| CN | 106170154 | A | 11/2016 |
| CN | 106416368 | A | 2/2017 |
| CN | 106941729 | A | 7/2017 |
| CN | 107277856 | A | 10/2017 |
| EP | 2166810 | B1 | 10/2013 |
| EP | 2887726 | A1 | 6/2015 |
| EP | 3070990 | A1 | 9/2016 |
| WO | 2011123549 | A1 | 10/2011 |

OTHER PUBLICATIONS

Extended European Search Report issued in European Application No. 19738096.7 dated Dec. 11, 2020, 10 pages.
Office Action issued in Chinese Application No. 201810032158.5 dated Dec. 30, 2020, 19 pages (with English translation).
3GPP TS 38.300 V15.0 0 (Dec. 2017), 3rd Generation Partnership Project, Technical Specification Group Radio Access Network, NR, NR and NG-RAN Overall Description, Stage 2(Release 15), 68 pages.
AT&T et al.,"New SID Proposal: Study on Integrated Access and Backhaul for NR",3GPP TSG RAN Meeting #75, RP-170831, Dubrovnik, Croatia, Mar. 6-9, 2017, 5 pages.
Office Action issued in Chinese Application No. 201810032158.5 dated Mar. 11, 2020, 25 pages (With English Translation).
Office Action issued in Chinese Application No. 201810032158.5 ated Aug. 11, 2020, 22 pages (With English Translation).
PCT International Search Report and Written Opinion in International Application No. PCT/CN2019/071,498, dated Apr. 11, 2019, 15 pages (With English Translation).

* cited by examiner

METHOD AND APPARATUS FOR SENDING DATA VOLUME REPORT

CROSS-REFERENCE TO RELATED APPLICATIONS

This application is a continuation of International Application No. PCT/CN2019/071498, filed on Jan. 11, 2019, which claims priority to Chinese Patent Application No. 201810032158.5, filed on Jan. 12, 2018. The disclosures of the aforementioned applications are hereby incorporated by reference in their entireties.

TECHNICAL FIELD

This application relates to the field of communications technologies, and in particular, to a method and an apparatus for sending a data volume report.

BACKGROUND

In long term evolution (LTE) and new radio (NR) systems, after user equipment (UE) establishes a connection to an access node (for example, a base station or a relay node), when the UE needs to send data to the access node, an uplink resource is required. If there is no uplink resource, the UE first needs to apply for an uplink resource from the access node. After applying for the uplink resource from the access node, the UE needs to report a buffer status report (BSR) to the access node, so that the access node schedules an appropriate uplink resource for the UE.

In a scenario in which a relay node (RN) is introduced between UE and a base station, as shown in FIG. 1, each access node independently manages an uplink resource of a device that accesses the access node (as shown in FIG. 1, the base station manages an uplink resource of an RN 1, and the RN 1 manages an uplink resource of an RN 2). Therefore, each access node may apply for an uplink resource in consideration of only a local uplink data buffer size of the access node.

However, when each access node applies for the uplink resource in consideration of only the local uplink data buffer size of the access node, if local uplink data of an access node is not transmitted in time at a scheduling moment t and other service data is received at the scheduling moment t, both the local uplink data of the access node and the other service data received at the current moment may be aggregated at the access node. That is, at the scheduling moment t, the uplink resource applied for by the access node cannot meet transmission of the local uplink data and the other service data. Because the other service data can be transmitted only after transmission of the local uplink data that is not transmitted is complete, service data that arrives at a subsequent moment can be transmitted only after the local uplink data is all transmitted. Consequently, congestion occurs at the access node, and a relatively high transmission delay is caused. For example, as shown in FIG. 1, the RN 1 is congested with uplink data 1 of the UE, uplink data 2 of the RN 2, and local uplink data 3 of the RN 1.

SUMMARY

This application provides a method and an apparatus for sending a data volume report, to resolve a problem that an access node is congested with data.

To resolve the foregoing technical problem, the following technical solutions are used in this application:

According to a first aspect, this application provides a method for sending a data volume report. The method is applied to a relay system, and includes: sending, by a first device, a first data volume report to an access device when a data volume reporting condition is met, where the first data volume report at least indicates at least one of an uplink data volume of the first device and an uplink data volume of another device that is received by the first device, and the data volume reporting condition includes any one or more of the following: at least one of the uplink data volume of the first device and the uplink data volume of the another device is greater than or equal to a first threshold; a time for which at least one of the uplink data volume of the first device and the uplink data volume of the another device is greater than or equal to the first threshold is greater than or equal to a first time threshold; instruction information used to instruct the first device to report at least one of the uplink data volume of the first device and a data volume report of the another device is received: at least one of a plurality of connections between the first device and the access device is disconnected; and a connection between the first device and another access device is disconnected.

This application provides the method for sending a data volume report, and the first device has any one of the following data volume reporting conditions: at least one of the uplink data volume of the first device and the uplink data volume of the another device is greater than or equal to the first threshold; the time for which at least one of the uplink data volume of the first device and the uplink data volume of the another device is greater than or equal to the first threshold is greater than or equal to the first time threshold: the instruction information used to instruct the first device to report at least one of the uplink data volume of the first device and the data volume report of the another device is received; at least one of the plurality of connections between the first device and the access device is disconnected; and the connection between the first device and the another access device is disconnected. In this way, when determining that the data volume reporting condition is met, the first device may actively send, to the access device, the first data volume report including the uplink data volume of the first device, the uplink data volume of the first device and the uplink data volume of the another device, or the uplink data volume of the another device, so that the access device preferentially schedules an uplink transmission resource for the first device, or schedules more resources based on the uplink data volume and the uplink data volume of the another device. In this way, when to-be-sent uplink data of the first device and uplink data of the another device that subsequently arrives can be sent in time, congestion caused at the first device when the to-be-sent uplink data that is to arrive at the first device and the uplink data volume of the first device are all aggregated at the first device can be avoided.

With reference to the first aspect, in a first possible implementation of the first aspect, the sending, by a first device, a first data volume report to an access device when the data volume reporting condition is met includes: when at least one of the plurality of connections between the first device and the access device is disconnected, sending, by the first device, the first data volume report to the access device through a connected connection in the plurality of connections; or when the connection between the first device and the another access device is disconnected, sending, by the first device, the first data volume report to the access device through a connection between the first device and the access device. The first data volume report is sent to the access device through the connected connection, so that the access device can receive the first data volume report in time.

With reference to the first aspect or the first possible implementation of the first aspect, in a second possible implementation of the first aspect, before the sending, by a first device, a first data volume report to an access device, the method provided in this application further includes: determining, by the first device, the first data volume report.

With reference to any one of the first aspect to the second possible implementation of the first aspect, in a third possible implementation of the first aspect, the determining the first data volume report includes: sending, by the first device, a first request message to a second device when the data volume reporting condition is met, where the first request message is used to instruct the second device to report at least one of an uplink data volume of the second device and an uplink data volume of at least one third device that is obtained by the second device; receiving, by the first device, a second data volume report sent by the second device, where the second data volume report includes at least one of the uplink data volume of the second device and the uplink data volume of the at least one third device; and determining, by the first device, the first data volume report based on at least one of the second data volume report and the uplink data volume of the first device. In this case, when the data volume reporting condition is met, the first device may actively obtain the uplink data volume of the another device, and determine the first data volume report based on at least one of the uplink data volume of the another device and the uplink data volume of the first device. In this way, an uplink resource allocated by the access device to the first device can not only satisfy the uplink data volume of the first device, but also satisfy the uplink data volume of the another device that is about to arrive at the first device, thereby avoiding congestion of data at the first device.

With reference to any one of the first aspect to the third possible implementation of the first aspect, in a fourth possible implementation of the first aspect, the determining, by the first device, the first data volume report includes: receiving, by the first device, the second data volume report sent by the second device, where the second data volume report is the instruction information used to instruct the first device to report at least one of the uplink data volume of the first device and the data volume report of the another device; and determining, by the first device, the first data volume report based on at least one of the second data volume report and the uplink data volume of the first device. Optionally, the second data volume report is sent by the second device to the first device when the second device determines that the data volume reporting condition is met. In this way, when receiving the second data volume report, the first device may determine the first data volume report.

With reference to any one of the first aspect to the fourth possible implementation of the first aspect, in a fifth possible implementation of the first aspect, the first data volume report includes an uplink data volume corresponding to each quality of service flow.

With reference to any one of the first aspect to the fifth possible implementation of the first aspect, in a sixth possible implementation of the first aspect, the method provided in this application further includes: determining, by the first device, the uplink data volume corresponding to each quality of service flow based on a mapping relationship between each quality of service flow and a corresponding data radio bearer DRB and a mapping relationship between the DRB and a logical channel or a logical channel group; or determining, by the first device, an uplink data volume corresponding to each quality of service requirement based on a quality of service requirement of service data of each quality of service flow, a mapping relationship between each quality of service flow and a corresponding data radio bearer DRB and a mapping relationship between the DRB and a logical channel or a logical channel group.

With reference to any one of the first aspect to the sixth possible implementation of the first aspect, in a seventh possible implementation of the first aspect, the first device has at least one of the following mapping relationships: the mapping relationship between each quality of service flow and the corresponding data radio bearer DRB, the mapping relationship between the DRB and the logical channel, the mapping relationship between each DRB and the logical channel or the logical channel group, and a mapping relationship between a logical channel group that is allocated by a next-hop device of the first device to a terminal and that is obtained by the first device and a logical channel group allocated by the first device to the next-hop device.

With reference to any one of the first aspect to the seventh possible implementation of the first aspect, in an eighth possible implementation of the first aspect, the method provided in this application further includes: when there are the first data volume report and another type of data volume report, determining, by the first device, that a sending priority of the first data volume report is higher than a sending priority of the another type of data volume report, where a type of the first data volume report is different from the another type. When the first device is triggered to send the first data volume report and the another type of data volume report at the same time, the sending priority of the first data volume report is set to highest. Because the first data volume report is to request the access device to allocate more uplink resources to the first device to avoid congestion of data at the first device, preferentially sending the first data volume report can avoid the congestion.

With reference to any one of the first aspect to the eighth possible implementation of the first aspect, in a ninth possible implementation of the first aspect, the method provided in this application further includes: receiving, by the first device, a first message sent by the access device, where the first message is used to determine a proportion of a data volume sent to the access device in a data volume to be reported by the first device. Optionally, the first message is further used by the first device to determine a proportion of a data volume sent to the another access device in the data volume to be reported by the first device. When the first device is in dual-connectivity, that is, there is a connection between the first device and the access device, and there is also a connection between the first device and the another access device, the first device may send data volume reports to different access devices respectively by using the first message, to request the different access devices to allocate uplink resources to the first device. An access device may not allocate an abundant supply of uplink resources to the first device, and in this case, if the another access device also allocates an uplink resource to the first device, it is ensured as much as possible that different access devices allocate more uplink resources to the first device, to avoid congestion.

With reference to any one of the first aspect to the ninth possible implementation of the first aspect, in a tenth possible implementation of the first aspect, the method provided in this application further includes: receiving, by the first device, a proportional relationship sent by the access device, where the proportional relationship includes information used to indicate a proportion of a data volume sent by the first device to the access device in a data volume to be reported by the first device; or receiving, by the first device, at least one first allocation proportion sent by the access device, where the at least one first allocation proportion is used by the first device to determine a proportion of a data volume sent to the access device in a data volume to be reported by the first device. Optionally, the proportional relationship is further used to indicate information about the proportion of the data volume sent by the first device to the another access device in the data volume to be reported by the first device.

With reference to any one of the first aspect to the tenth possible implementation of the first aspect, in an eleventh possible implementation of the first aspect, the method provided in this application further includes: receiving, by the first device, a second message sent by the access device, where the second message is used by the first device to determine a proportion of a data volume sent on each of the plurality of connections in the data volume to be reported by the first device. The data volume to be reported by the first device is sent to the access device on different connections, it can be ensured as much as possible that the access device receives the first data volume report.

With reference to any one of the first aspect to the eleventh possible implementation of the first aspect, in a twelfth possible implementation of the first aspect, the method provided in this application further includes: receiving, by the first device, an allocation proportion relationship sent by the access device, where the allocation proportion relationship includes a proportion of a data volume sent on each of the plurality of connections in the data volume to be reported by the first device.

According to a second aspect, this application provides a method for sending a data volume report. The method is applied to a relay system, and includes: sending, by an access device to a first device, a message used to trigger the first device to send a first data volume report, where the first data volume report at least indicates at least one of an uplink data volume of the first device and an uplink data volume of another device that is received by the first device, and the message used to trigger the first device to send the first data volume report includes any one or more of the following: information used to indicate a first threshold, information used to indicate the first threshold and information used to indicate a first time threshold, and instruction information used to instruct the first device to report the uplink data volume of the first device and a data volume report of the another device; and receiving, by the access device, the first data volume report sent by the first device.

With reference to the second aspect, in a first possible implementation of the second aspect, before the sending, by an access device to a first device, a message used to trigger the first device to send a first data volume report, the method provided in this application further includes: if the access device determines that a quantity of devices served by any one of at least one fourth device is greater than or equal to a second threshold, determining, by the access device, that the fourth device is the first device. The fourth device whose quantity of devices served by the fourth device is greater than or equal to the second threshold is determined as the first device. In this way, the access device may configure the foregoing information only for a device at which congestion is easy to occur.

With reference to the second aspect or the first possible implementation of the second aspect, in a second possible implementation of the second aspect, the access device sends a first message to the first device, where the first message is used to indicate information about a proportion of a data volume sent by the first device to the access device in a data volume to be reported by the first device. Optionally, the first message sent by the access device to the first device is further used to indicate information about a proportion of a data volume sent to another access device in the data volume to be reported by the first device.

With reference to any one of the second aspect to the second possible implementation of the second aspect, in a third possible implementation of the second aspect, the method provided in this application further includes: sending, by the access device, a proportional relationship to the first device, where the proportional relationship includes the information used to indicate the proportion of the data volume sent by the first device to the access device in the data volume to be reported by the first device; or sending, by the access device, at least one first allocation proportion to the first device, where the at least one first allocation proportion is used by the first device to determine the proportion of a data volume sent to the access device in the data volume to be reported by the first device. Optionally, the proportional relationship is further used to indicate information about the proportion of the data volume sent by the first device to the another access device in the data volume to be reported by the first device.

With reference to any one of the second aspect to the third possible implementation of the second aspect, in a fourth possible implementation of the second aspect, the method provided in this application further includes: sending, by the access device, a second message to the first device, where the second message is used by the first device to determine a proportion of a data volume sent on each of a plurality of connections in the data volume to be reported by the first device.

With reference to any one of the second aspect to the fourth possible implementation of the second aspect, in a fifth possible implementation of the second aspect, the receiving, by the access device in this application, the first data volume report sent by the first device includes: receiving, by the access device, the first data volume report through a connected connection between the access device and the first device: or receiving, by the access device, a data volume sent by the first device based on the proportional relationship.

Correspondingly, according to a third aspect, this application provides an apparatus for sending a data volume report. The apparatus for sending a data volume report may implement the method for sending a data volume report described in any one of the first aspect to the eleventh possible implementation of the first aspect. For example, the apparatus for sending a data volume report may be a first device, or may be a chip disposed in a first device. The foregoing method may be implemented by software, hardware, or hardware executing corresponding software.

The apparatus for sending a data volume report is applied to a relay system and includes: a sending unit, configured to: send, by a first device, a first data volume report to an access device when a data volume reporting condition is met, where the first data volume report at least indicates at least one of an uplink data volume of the first device and an uplink data volume of another device that is received by the first device, and the data volume reporting condition includes any one or more of the following: at least one of the uplink data volume of the first device and the uplink data volume of the another device is greater than or equal to a first threshold: a time for which at least one of the uplink data volume of the first device and the uplink data volume of the another device is greater than or equal to the first threshold is greater than or equal to a first time threshold; instruction information used to instruct the first device to report at least one of the uplink data volume of the first device and a data volume report of the another device is received: at least one of a plurality of connections between the first device and the access device is disconnected; and a connection between the first device and another access device is disconnected.

With reference to the third aspect, in a first possible implementation of the third aspect, the sending unit is specifically configured to: when the data volume reporting condition is met, and when at least one of the plurality of connections between the first device and the access device is disconnected, send the first data volume report to the access device through a connected connection in the plurality of connections: or the sending unit is specifically configured to: when the connection between the first device and the another access device is disconnected, send the first data volume report to the access device through a connection between the first device and the access device.

With reference to the third aspect or the first possible implementation of the third aspect, in a second possible implementation of the third aspect, the apparatus provided in this application further includes a determining unit, configured to determine the first data volume report.

With reference to any one of the third aspect to the second possible implementation of the third aspect, in a third possible implementation of the third aspect, the apparatus provided in this application further includes: a receiving unit, where the sending unit is further configured to send a first request message to a second device when the data volume reporting condition is met, where the first request message is used to instruct the second device to report at least one of an uplink data volume of the second device and an uplink data volume of at least one third device that is obtained by the second device: the receiving unit is configured to receive a second data volume report sent by the second device, where the second data volume report includes at least one of the uplink data volume of the second device and the uplink data volume of the at least one third device; and the determining unit is specifically configured to determine the first data volume report based on at least one of the second data volume report and the uplink data volume of the first device.

With reference to any one of the third aspect to the third possible implementation of the third aspect, in a fourth possible implementation of the third aspect, the receiving unit is configured to receive a second data volume report sent by a second device, where the second data volume report is the instruction information used to instruct the first device to report at least one of the uplink data volume of the first device and the data volume report of the another device; and the determining unit is specifically configured to determine the first data volume report based on at least one of the second data volume report and the uplink data volume of the first device.

With reference to any one of the third aspect to the fourth possible implementation of the third aspect, in a fifth possible implementation of the third aspect, the first data volume report includes an uplink data volume corresponding to each quality of service flow.

With reference to any one of the third aspect to the fifth possible implementation of the third aspect, in a sixth possible implementation of the third aspect, the determining unit is further configured to determine the uplink data volume corresponding to each quality of service flow based on a mapping relationship between each quality of service flow and a corresponding data radio bearer, and a mapping relationship between the data radio bearer and a logical channel or a logical channel group; or the determining unit is configured to determine an uplink data volume corresponding to each quality of service requirement based on a quality of service requirement of service data of each quality of service flow, a mapping relationship between each quality of service flow and a corresponding data radio bearer, and a mapping relationship between the data radio bearer and a logical channel or a logical channel group.

With reference to any one of the third aspect to the sixth possible implementation of the third aspect, in a seventh possible implementation of the third aspect, the determining unit is further configured to: when there are the first data volume report and another type of data volume report, determine, by the first device, that a sending priority of the first data volume report is higher than a sending priority of the another type of data volume report, where a type of the first data volume report is different from the another type.

With reference to any one of the third aspect to the seventh possible implementation of the third aspect, in an eighth possible implementation of the third aspect, the receiving unit is further configured to receive a first message sent by the access device, where the first message is used to determine a proportion of a data volume sent to the access device in a data volume to be reported by the first device. Optionally, the first message is further used to determine a proportion of a data volume sent to the another access device in the data volume to be reported by the first device.

With reference to any one of the third aspect to the eighth possible implementation of the third aspect, in a ninth possible implementation of the third aspect, the receiving unit is further configured to receive a proportional relationship sent by the base station, where the proportional relationship includes information used to indicate the proportion of the data volume sent by the first device to the access device in the data volume to be reported by the first device; or the receiving unit is further configured to receive at least one first allocation proportion sent by the access device, where the at least one first allocation proportion is used by the first device to determine a proportion of a data volume sent to the access device in a data volume to be reported by the first device. Optionally, the proportional relationship is further used to indicate information about the proportion of the data volume sent by the first device to the another access device in the data volume to be reported by the first device.

With reference to any one of the third aspect to the tenth possible implementation of the third aspect, in an eleventh possible implementation of the third aspect, the receiving unit is further configured to receive a second message sent by the access device, where the second message is used by the first device to determine a proportion of a data volume sent on each of the plurality of connections in the data volume to be reported by the first device.

According to a fourth aspect, in a possible design, the apparatus for sending a data volume report may be a first device or a chip in a first device, and the apparatus for sending a data volume report may include at least one processor. The at least one processor is configured to support, by executing an instruction, the apparatus for sending a data volume report in performing an operation related to message processing or control performed at the apparatus side for sending a data volume report in the method described in any one of the first aspect to the eleventh possible implementation of the first aspect. Optionally, the apparatus may further include a memory, configured to be coupled to at least one processor, and the memory stores a program (instruction) and data that are necessary for the apparatus. In addition, optionally, the apparatus for sending a data volume report may further include a communications interface, configured to support communication between the apparatus for sending a data volume report and another network element (for example, a terminal and a base station). The communications interface may be a transceiver circuit. The transceiver circuit is configured to support the apparatus for sending a data volume report in performing an operation related to message receiving and sending at the apparatus side for sending a data volume report in the method described in any one of the first aspect to the eleventh possible implementation of the first aspect. Optionally, the apparatus for sending a data volume report may further include a bus. The memory, the communications interface, and the at least one processor may be interconnected by using the bus.

Correspondingly, according to a fourth aspect, this application provides an apparatus for sending a data volume report. The apparatus for sending a data volume report may implement the method for sending a data volume report described in any one of the second aspect to the sixth possible implementation of the second aspect. For example, the apparatus for sending a data volume report may be an access device, or may be a chip disposed in an access device. The apparatus may implement the foregoing method by software, hardware, or hardware executing corresponding software.

According to a fifth aspect, an apparatus for sending a data volume report is applied to a relay system, and the apparatus for sending a data volume report includes: a sending unit, configured to send, to a first device, a message used to trigger the first device to send a first data volume report, where the first data volume report indicates at least one of an uplink data volume of the first device and an uplink data volume of another device that is received by the first device, and the message used to trigger the first device to send the first data volume report includes any one or more of the following: information used to indicate a first threshold, information used to indicate the first threshold and information used to indicate a first time threshold, and instruction information used to instruct the first device to report at least one of the uplink data volume of the first device and a data volume report of the another device; and a receiving unit, configured to receive the first data volume report sent by the first device.

With reference to the fifth aspect, in a first possible implementation of the fifth aspect, before the access device sends, to the first device, the message used to trigger the first device to send the first data volume report, the apparatus provided in this application further includes: a determining unit, configured to determine that a quantity of devices served by any one of at least one fourth device is greater than or equal to a second threshold, and determine that the fourth device is the first device.

With reference to the fifth aspect or the first possible implementation of the fifth aspect, in a second possible implementation of the fifth aspect, the sending unit provided in this application is further configured to send, to the first device, the first message including information used to indicate a proportion of a data volume sent by the first device to the apparatus for sending a data volume report in a data volume to be reported by the first device. Optionally, the first message is further used to indicate information about a proportion of a data volume sent by the first device to another access device in the data volume to be reported by the first device.

With reference to any one of the fifth aspect to the second possible implementation of the fifth aspect, in a third possible implementation of the fifth aspect, the sending unit is further configured to send a proportional relationship to the first device, where the proportional relationship includes the information used to indicate the proportion of the data volume sent by the first device to the apparatus for sending a data volume report in the data volume to be reported by the first device: or send, by the access device, at least one first allocation proportion to the first device, where the at least one first allocation proportion is used by the first device to determine the proportion of the data volume sent to the apparatus for sending a data volume report in the data volume to be reported by the first device. Optionally, the proportional relationship further includes the information used to indicate the proportion of the data volume sent by the first device to the another access device in the data volume to be reported by the first device.

With reference to any one of the fifth aspect to the third possible implementation of the fifth aspect, in a fourth possible implementation of the fifth aspect, the sending unit is further configured to send a second message to the first device, where the second message is used by the first device to determine a proportion of a data volume sent on each of a plurality of connections in the data volume to be reported by the first device.

With reference to any one of the fifth aspect to the fourth possible implementation of the fifth aspect, in a fifth possible implementation of the fifth aspect, the receiving unit is specifically configured to receive the first data volume report through a connected connection between the apparatus for sending a data volume report and the first device, or receive a data volume sent by the first device based on the proportional relationship.

According to a sixth aspect, in a possible design, the apparatus for sending a data volume report may be an access device or a chip in an access device, and the apparatus for sending a data volume report may include at least one processor. The at least one processor is configured to support, by executing an instruction, the apparatus for sending a data volume report in performing an operation related to message processing or control performed at the apparatus side for sending a data volume report in the method described in any one of the second aspect to the fifth possible implementation of the second aspect. Optionally, the apparatus may further include a memory, configured to be coupled to at least one processor, and the memory stores a program (instruction) and data that are necessary for the apparatus. In addition, optionally, the apparatus for sending a data volume report may further include a communications interface, configured to support communication between the apparatus for sending a data volume report and another network element (for example, a first device). The communications interface may be a transceiver circuit. The transceiver circuit is configured to support the apparatus for sending a data volume report in performing an operation related to message receiving and sending at the apparatus side for sending a data volume report in the method described in any one of the second aspect to the fifth possible implementation of the second aspect. Optionally, the apparatus for sending a data volume report may further include a bus. The memory, the communications interface, and the at least one processor may be interconnected by using the bus.

According to a seventh aspect, this application provides a computer-readable storage medium. The computer-readable storage medium stores an instruction. When the instruction is run, the method for sending a data volume report described in any one of the first aspect to the twelfth possible implementation of the first aspect is performed.

According to an eighth aspect, this application provides a computer-readable storage medium. The computer-readable storage medium stores an instruction. When the instruction is executed, the method for sending a data volume report described in any one of the second aspect to the fifth possible implementation of the second aspect is performed.

According to a ninth aspect, this application provides a computer program product including an instruction. The computer program product stores an instruction, and when the instruction is run, a first device is enabled to perform the method for sending a data volume report described in any one of the first aspect to the twelfth possible implementation of the first aspect.

According to a tenth aspect, this application provides a computer program product including an instruction. The computer program product stores the instruction. When the instruction is run, the access device is enabled to perform the method for sending a data volume report described in any one of the second aspect to the fifth possible implementation of the second aspect.

According to an eleventh aspect, this application provides a chip system. The chip system is applied to an apparatus for sending a data volume report, and includes at least one processor and an interface circuit. The interface circuit and the at least one processor are interconnected by using a line, and the processor is configured to run an instruction, to perform the method for sending a data volume report described in any one of the first aspect to the twelfth possible implementation of the first aspect.

According to a twelfth aspect, this application provides a chip system. The chip system is applied to an apparatus for sending a data volume report, and includes at least one processor and an interface circuit. The interface circuit and the at least one processor are interconnected by using a line, and the processor is configured to run an instruction, to perform the method for sending a data volume report described in any one of the second aspect to the fifth possible implementation of the second aspect.

The interface circuit in the chip system may be an input/output interface, a pin, a circuit, or the like.

Optionally, the chip system described above in this application further includes at least one memory, and the at least one memory stores the instruction. The memory may be a storage unit in the chip system, for example, a register or a cache, or may be a storage unit (for example, a read-only memory or a random access memory) in the chip system.

This application provides a relay system. The relay system includes the first device described in the third aspect or the third aspect, and the at least one access device described in any one of the fifth aspect or the fifth aspect.

In a possible design, the system may further include the another device that interacts with the at least one access device and the first device in the solutions provided in the embodiments of the present invention.

DESCRIPTION OF EMBODIMENTS

Figure 2:
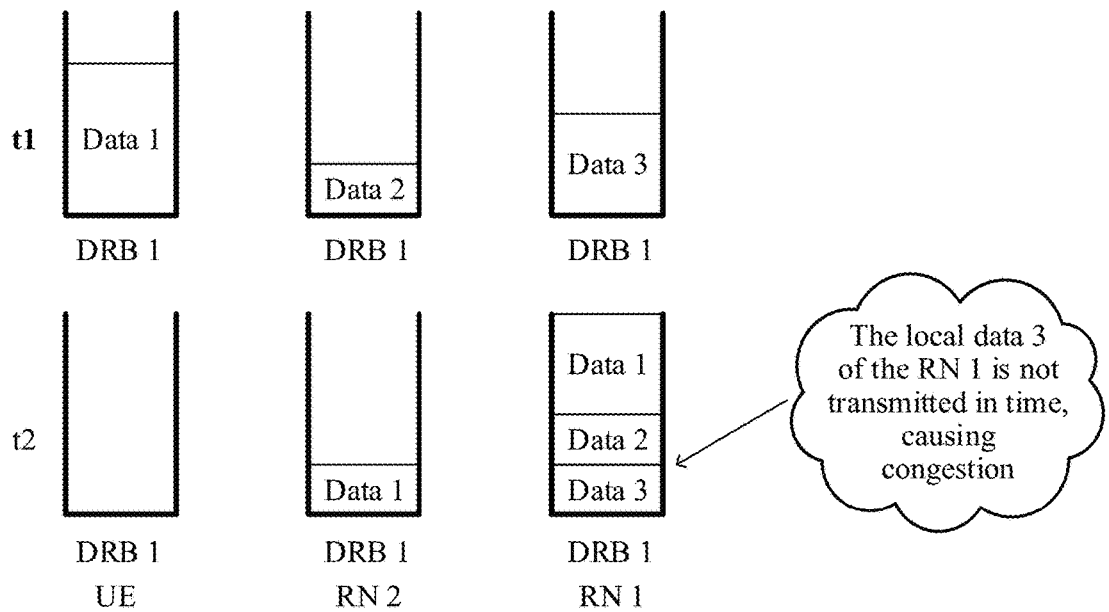
FIG. 2 is a schematic diagram in which an access node is congested with data.

Embodiments of this application provide a method and an apparatus for sending a data volume report, to resolve the following problem in a scenario shown in FIG. 2: When an RN 1 requests an uplink resource from a base station based on local data 3 of the RN 1, an uplink resource allocated by the base station to the RN 1 may be less than a size of the local data 3 of the RN 1. Consequently, when the RN 1 fails to transfer the local data 3 to the base station in time, uplink data 2 of an RN 2 and uplink data 1 of UE that are received by the RN 1 may be both aggregated at the RN 1 in a period of time, causing congestion of the data at an access node. The method and apparatus are based on a same inventive concept. Because a problem-resolving principle of the method is similar to that of the apparatus, mutual reference may be made to implementations of the apparatus and the method, and a repeated part is not described.

Before the embodiments of this application are described, terms in the embodiments of this application are first described.

1. A combined data volume report means that when a device A reports a data volume report to a device B, the data volume report not only includes an uplink data volume of the device A or information used to indicate an uplink data volume of the device A, but also includes an uplink data volume sent by another device or information used to indicate an uplink data volume sent by another device that is received by the device A.

2. An uplink data volume refers to a size of a data volume in a local uplink buffer of a device, that is, a data volume that has arrived at the device or a data volume generated by the device.

Figure 1:
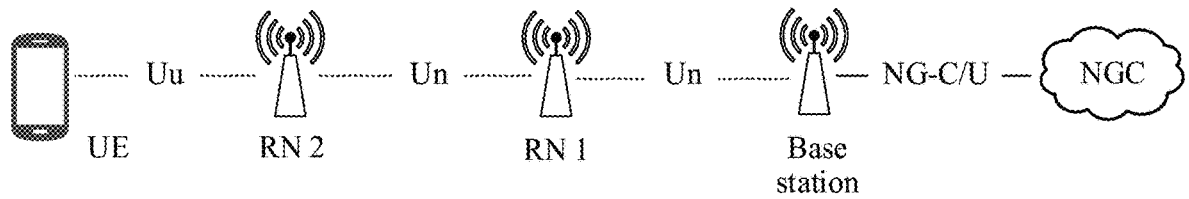
FIG. 1 is a schematic architectural diagram of a communications system.

3. A direct service means that if a device A is directly connected to another device B, the device B may directly provide a service for the device A. An indirect service means that if a device C is connected to the device A via the device B, the device A provides an indirect service for the device C. For example, as shown in FIG. 1, an RN 1 and/or a base station provides an indirect service for a terminal: the base station provides an indirect service for an RN 2. Correspondingly, a served terminal and RN may be referred to as child nodes. A base station, an RN, and even a terminal that provide a service may be referred to as parent nodes. The service may be a function of a control plane. For example, the device A provides access control for the device B or manages context of the device B. The service may alternatively be a function of a data plane. Data sent by the device B to a core network is transferred by the device A.

It should be noted that, in the embodiments of this application, the word "example" or words "for example" are used to give an example, an illustration, or a description. Any embodiment or design scheme described as "example" or "for example" in the embodiments of this application should not be explained as being more preferred or having more advantages than another embodiment or design scheme. Exactly, use of the word "example", words "for example", or the like is intended to present a related concept in a specific manner.

The term "and/or" in the embodiments of this application describes only an association relationship for describing associated objects and represents that three relationships may exist. For example, A and/or B may represent the following three cases: Only A exists, both A and B exist, and only B exists. In addition, the character "/" in the embodiments of this application generally indicates an "or" relationship between the associated objects.

Network architectures and service scenarios described in the embodiments of this application are intended to describe the technical solutions in the embodiments of this application more clearly, and do not constitute a limitation on the technical solutions provided in the embodiments of this application. A person of ordinary skill in the art may know that: With the evolution of network architectures and the emergence of new service scenarios, the technical solutions provided in the embodiments of this application can also resolve similar technical problems.

The term "a plurality of" in the embodiments of this application means two or more.

The terms such as "first" and "second" in the embodiments of this application are merely intended to distinguish between different objects, but constitute no limitation on a sequence of these different objects. For example, a first device and a second device are merely intended to distinguish between different devices, and do not limit a sequence thereof.

In this application. "at least one" means one or more, and "a plurality of" means two or more. The term "and/or" describes an association relationship of associated objects and represents that three relationships may exist. For example, A and/or B may represent the following cases: Only A exists, both A and B exist, and only B exists. A and B may be in a singular or plural form. The character "/" generally indicates an "or" relationship between the associated objects. "At least one of the following items" or a similar expression indicates any combination of the items, and includes any combination of one or more of the items. For example, at least one of a, b, or c may represent a, b, c, a combination of a and b, a combination of a and c, a combination of b and c, or a combination of a, b, and c, where a, b, and c may be in a singular or plural form.

Figure 3:
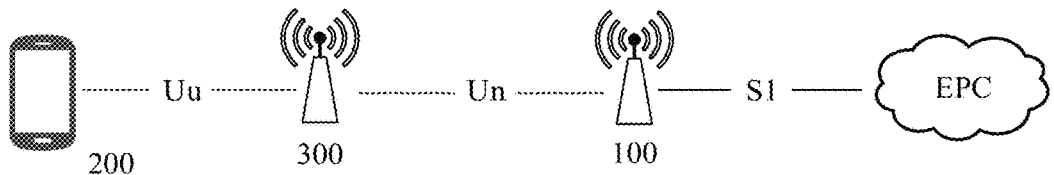
FIG. 3 is a schematic structural diagram of a relay system according to this application.

FIG. 3 is a schematic diagram of a relay system. The relay system may be applied to a 5G system, or may be applied to a 4G system, and includes at least one base station 100 (only one base station is shown) connected to a core network, one or more terminals 200 (only one terminal is shown) connected to the base station 100, and a relay node (RN) located between the base station 100 and the terminal 200, for example, an RN 300 shown in FIG. 3.

Wireless connections are used between the RN 300 and the terminal 200 and between the RN 300 and the base station 100. For example, a 4G system is used as an example. A wireless interface between the RN 300 and the base station 100 is an Un interface, an interface between the terminal 200 and the RN 300 is a Uu interface, and an interface between the base station 100 and the core network may be an S1 interface.

It should be noted that names of the interfaces between the network elements in FIG. 3 are merely examples. When the relay system is specifically applied to different systems, the names of the interfaces may be other names. This is not specifically limited in this embodiment of this application.

The RN is configured to transfer data and signaling between the base station 100 and the terminal 200. The base station 100 may also be usually used as a donor base station. In a new radio (NR) system (or referred to as a 5G system), the donor base station may be a (DgNB). In an LTE system (or referred to as a 4G system), the donor base station may be a (DeNB). Certainly, the donor base station may also be referred to as a gNB or an eNB for short.

For example, the base station is a DeNB. The DeNB is configured to manage access of the RN, and schedule a resource such as a backhaul link (where the backhaul link is a link between the RN 300 and the base station 100) for the RN. There is a connection between the DeNB and the core network: The RN 300 receives data of the terminal 200, and sends the data to the DeNB by using the resource such as the backhaul link. Then, the DeNB sends, the data received through the air interface, to the core network through the S1 interface. In addition, the DeNB may also provide functions such as access and mobility management for the terminal 200.

In a 4G system, the core network may be an evolved packet core network (EPC), including function entities such as a service gateway (S-GW) and an MME of a terminal. In a 5G system, a next generation core network (NGC) includes function entities such as a session management function (SMF) and an access and mobility management function (AMF), and provides functions such as authentication and mobility management for the terminal.

In an actual communication process, the RN usually serves as an access device similar to a base station. However, when performing access authentication and some security functions, the RN serves as a terminal to perform processing. When the RN serves a terminal, the RN may access a wireless network like a terminal. When the terminal accesses the wireless network, a network side performs user authentication and key agreement (AKA) on the terminal.

During initial access, the RN performs a terminal function, establishes a connection to the base station 100 by performing operations such as cell selection and random access, and obtains an air interface resource configuration, for example, a data radio bearer (DRB) of the Un interface. After accessing a network, the RN performs an access node function. The RN may send a synchronization signal and a system message to the terminal 200 for selection and access, configure an air interface resource for the accessed terminal 200, and schedule the terminal 200. In addition, data received by the RN 300 from the terminal 200 needs to be forwarded by using the DRB of the Un interface.

As described above, the RN 300 manages access of the terminal 200, and also manages a configuration of a DRB of the Uu interface. The DeNB manages access of the RN 300 and the configuration of the DRB of the Un interface.

Generally, the RN serves as a base station for a terminal served by the RN, and serves as a terminal for a base station serving the RN. For example, in the architecture shown in FIG. 3, in a downlink transmission process, downlink data or downlink signaling sent by the core network first arrives at the base station 100, then the base station 100 transfers the downlink data or the downlink signaling to a next-hop RN (for example, the RN 300) of the base station 100, and finally the RN 300 transfers the downlink data or the downlink signaling to the terminal 200. In an uplink transmission process, uplink data or uplink signaling sent by the terminal 200 is first transferred to the RN 300, and then the RN 300 sends the received uplink data or uplink signaling to the base station 100.

The base station 100 may be a device that communicates with the terminal 200, and the base station 100 may be a relay station, an access point, or the like. The base station 100 may be a base transceiver station (BTS) in a global system for mobile communication (GSM) network or a code division multiple access (CDMA) network, or may be an eNB or an eNodeB (evolutional NodeB) in LTE. Alternatively, the base station 100 may be a radio controller in a cloud radio access network (CRAN) scenario. Alternatively, the base station 100 may be a network device in a 5G network or a network device in a future evolved network, for example, a next-generation base station (gNB), or may be a wearable device, a vehicle-mounted device, or the like.

Figure 4:
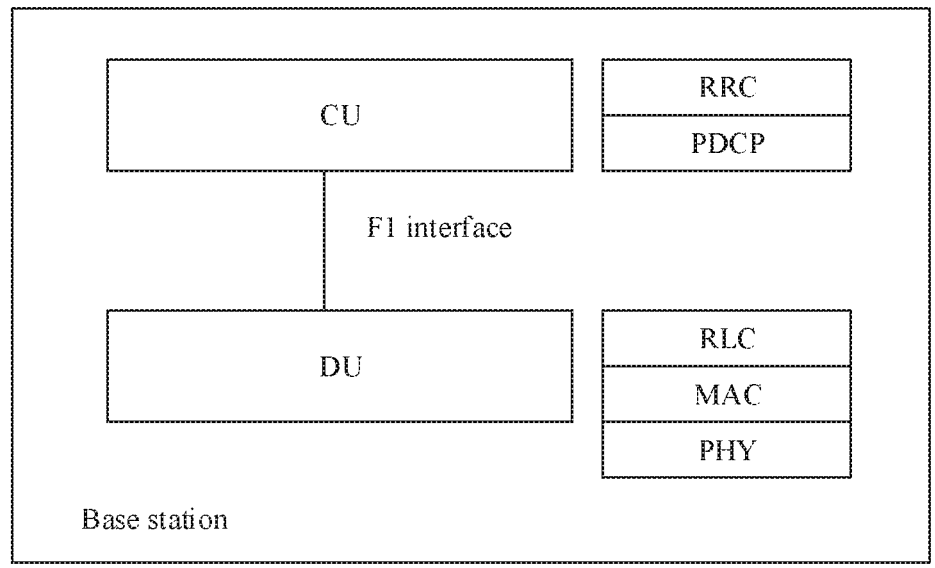
FIG. 4 is a schematic structural diagram of a base station according to this application.

A future access network may be implemented by using a cloud radio access network (C-RAN) architecture. In a possible manner, a protocol stack architecture and a function of a conventional base station are separated as two parts: One part is referred to as a central unit (CU), and the other part is referred to as a distributed unit (DU). However, an actual deployment manner of the CU and the DU is relatively flexible. For example, CU parts of a plurality of base stations are integrated, to form a function entity of a relatively large scale. As shown in FIG. 4, an access network base station is used an example. A base station 100 may be split into one CU and at least one DU. The CU is connected to each DU through an F1 interface. In a possible option, the CU is configured to implement functions of a radio resource control (RRC) layer and a packet data convergence protocol (PDCP) layer of the base station. The DU is configured to implement functions of a radio link control (RLC) layer, a media access control (MAC) layer, and a physical layer (PHY) layer of the base station.

A terminal 200 may also be referred to as user equipment (UE), an access terminal, a subscriber unit, a subscriber station, a mobile station, a mobile unit, a remote station, a remote terminal, a mobile device, a user terminal, a terminal device, a wireless communications device, a user agent, a user apparatus, or the like. The terminal 200 may communicate with one or more core networks (for example, a network slice) over a radio access network (RAN), or may communicate with another terminal, for example, in a device to device (D2D) scenario or a machine to machine (M2M) scenario. The terminal may be a station (STA) in a wireless local area network (WLAN), or may be a cellular phone, a cordless telephone set, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, a wearable device, and a terminal, for example, a terminal in a next-generation communications system such as a fifth-generation (5G) communications network, or a terminal in a future evolved public land mobile network (PLMN) network.

In an example, in the embodiments of the present invention, the terminal device may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not only a hardware device, but also is used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application functions and need to work with other devices such as smartphones, such as various smart bands and smart jewelry for monitoring physical signs.

Figure 5:
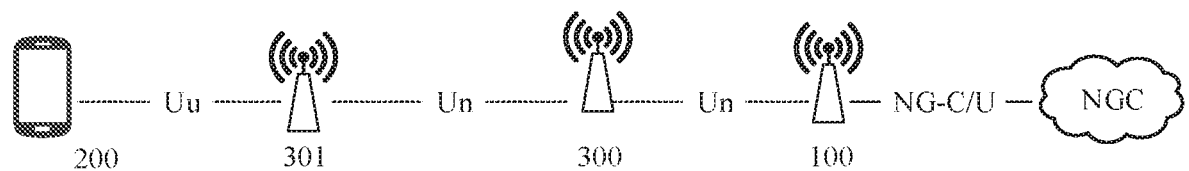
FIG. 5 is another schematic structural diagram of a relay system according to this application.

FIG. 5 is a schematic diagram of another relay system according to an embodiment of this application. A difference between FIG. 5 and FIG. 3 lies in: FIG. 3 shows a single-hop relay system which may be applied to a 4G system and a 5G system, that is, the terminal 200 accesses the base station 100 by using the RN 300, and in the 5G system, after accessing a base station as a terminal, a relay device may also have a capability of accessing another RN. For example, the relay device serves as an access device to send a system message or a synchronization signal for access by another device, for example, for access by a relay device, to form a multi-relay system. As shown in FIG. 5, a terminal 20 accesses a base station 100 by using an RN 300 and an RN 301, to form a multi-relay system architecture.

Specifically, in a 5G system, there is a next generation user plane (NG-U) and a next generation control plane (NG-C) between a base station and a core network (which may be, for example, a next generation core network (NGC).

The NGC is configured to provide functions such as mobility management and data forwarding for a terminal and an RN in the 5G system.

Figure 6:
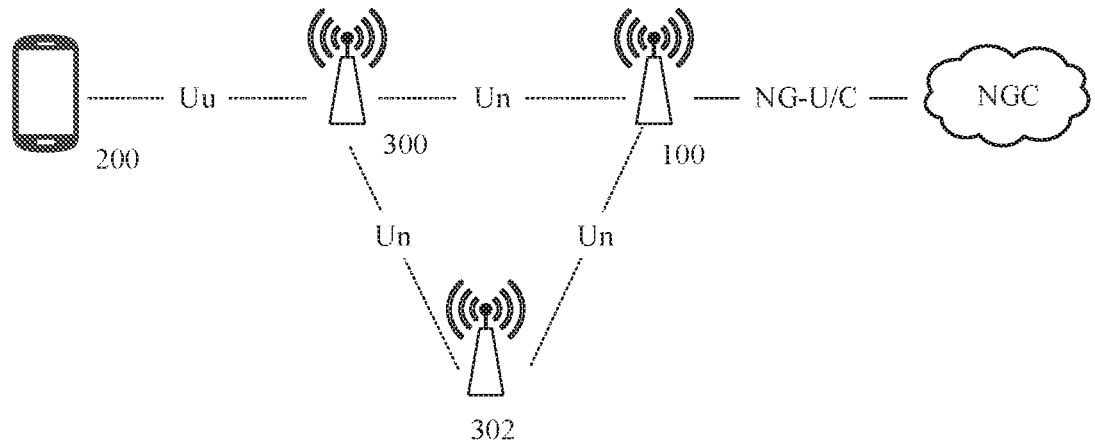
FIG. 6 is still another schematic structural diagram of a relay system according to this application.

FIG. 6 shows another multi-connection relay system. A difference between FIG. 6 and FIG. 5 lies in: In FIG. 6, there is a connection between an RN 300 and a base station 100, and there is a connection between the RN 300 and an RN 302, that is, the RN 300 is connected to both the base station 100 and the RN 302, that is, the RN 300 is in a dual-connectivity state. In the scenario shown in FIG. 6, the RN 300 may directly send data and/or signaling to the base station 100, or request an uplink resource from the base station 100: or the RN 300 may send data and/or signaling to the RN 302, or request an uplink resource from the RN 302.

It should be noted that FIG. 3, FIG. 5, and FIG. 6 are merely schematic diagrams of a communications system architecture used in the embodiments of this application. In an actual communication process, more or more complex communications system architectures may be further included.

The access device in the embodiments of this application may be a base station, or may be a previous-hop relay device accessed by a first device. For example, in the architecture shown in FIG. 3, when the first device is the RN 300, the access device may be the base station 100. When the first device is the terminal 200, the access device may be the RN 300. In the architecture shown in FIG. 5, when the first device is the RN 301, the access device may be the RN 300.

Figure 7:
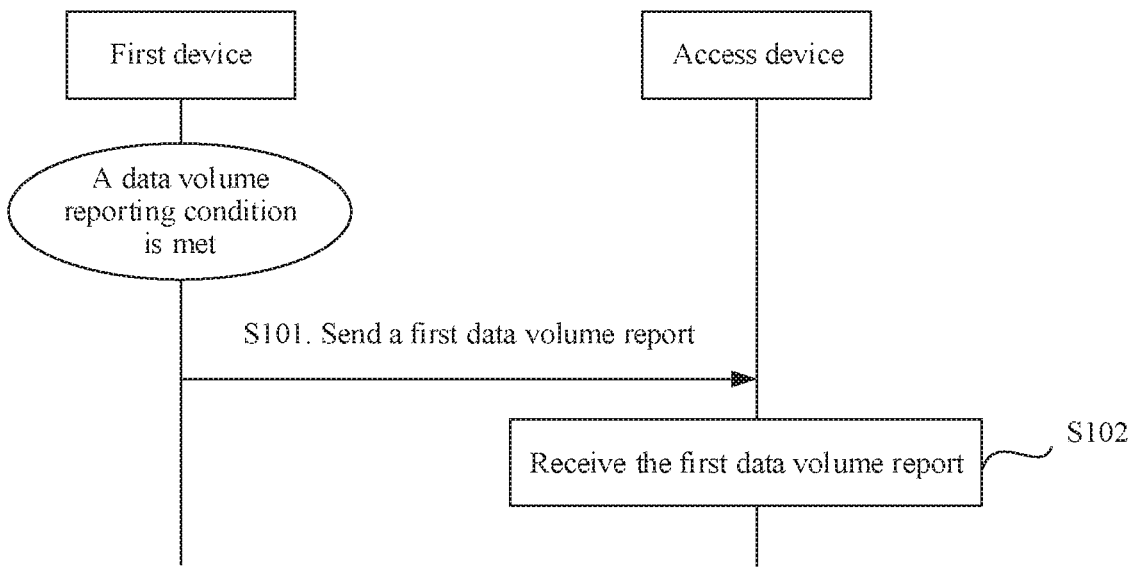
FIG. 7 is a schematic flowchart 1 of a method for sending a data volume report according to this application.

FIG. 7 is a schematic flowchart of a method for sending a data volume report according to an embodiment of this application. The method is applied to a relay system and includes the following steps.

S101. A first device sends a first data volume report to an access device when a data volume reporting condition is met, where the first data volume report at least indicates at least one of an uplink data volume of the first device and an uplink data volume of another device that is received by the first device, and the data volume reporting condition includes any one or more of the following: at least one of the uplink data volume of the first device and the uplink data volume of the another device is greater than or equal to a first threshold; a time for which at least one of the uplink data volume of the first device and the uplink data volume of the another device is greater than or equal to the first threshold is greater than or equal to a first time threshold; instruction information used to instruct the first device to report at least one of the uplink data volume of the first device and a data volume report of the another device is received; at least one of a plurality of connections between the first device and the access device is disconnected; and a connection between the first device and another access device is disconnected.

Specifically, that at least one of the uplink data volume of the first device and the uplink data volume of the another device is greater than or equal to the first threshold includes the following cases: the uplink data volume of the first device is greater than or equal to the first threshold; the uplink data volume of the another device is greater than or equal to the first threshold; and a sum of the uplink data volume of the first device and the uplink data volume of the another device is greater than the first threshold. That the time for which at least one of the uplink data volume of the first device and the uplink data volume of the another device is greater than or equal to the first threshold is greater than or equal to the first time threshold includes the following cases: a time for which the uplink data volume of the first device is greater than or equal to the first threshold is greater than or equal to the first time threshold: a time for which the uplink data volume of the another device is greater than or equal to the first threshold is greater than or equal to the first time threshold: and a time for which a sum of the uplink data volume of the first device and the uplink data volume of the another device is greater than or equal to the first threshold is greater than or equal to the first time threshold.

Specifically, the indicated uplink data volume of the first device may be a size of a data volume buffered by the first device.

In this embodiment of this application, the instruction information used to instruct the first device to report at least one of the uplink data volume of the first device and the data volume report of the another device may be sent by a next-hop device of the first device to the first device, or may be sent by the access device to the first device. When the instruction information may be sent by the next-hop device of the first device to the first device, the instruction information is used to instruct the first device to report the uplink data volume of the first device and the data volume report of the another device, or used to instruct the first device to report the data volume report of the another device. When the instruction information is sent by the access device to the first device, the instruction information is used to instruct the first device to report the uplink data volume of the first device and the data volume report of the another device, used to instruct the first device to report the data volume report of the another device, or used to instruct the first device to report the uplink data volume of the first device.

The data volume report in this embodiment of this application may be a BSR in LTE. Certainly, the BSR may still be used in 5G.

In this embodiment of this application, content of the first data volume report may have a plurality of forms. Specifically, in a form, the first data volume report includes the uplink data volume of the first device and a first identifier. The first identifier is used to indicate the data volume report of the another device that is received by the first device, or the first identifier is used to indicate that a type of the first data volume report is a combined data volume report. Therefore, when the first data volume report is used to indicate a size of the uplink data volume of the first device and the first identifier, it is convenient for the access device to preferentially allocate an uplink resource to the first device based on information used to indicate the size of the uplink data volume of the first device, or allocate more uplink resources to the first device during each scheduling.

In another form, the first data volume report includes a size of the uplink data volume of the first device and a size of the uplink data volume of the another device. The another device may be a terminal and/or a relay device served by the first device. For example, in the architecture shown in FIG. 3, if an example in which the first device is the RN 300 is used, the another device may be the terminal 200. In another example, in the architecture shown in FIG. 5, if an example in which the first device is the RN 300 is used, the another device may be the RN 301 and the terminal 200. In still another example, in an architecture shown in FIG. 8, if an example in which the first device is an RN 301 is used, the another device may be an RN 302, a terminal 3, a terminal 1, and a terminal 2.

Specifically, the first data volume report includes the information used to indicate the size of the uplink data volume of the first device and information used to indicate the size of the uplink data volume of the another device. For example, the first data volume report includes a size, namely, ten bytes, of an uplink data volume of the RN 300 and a size, namely, five bytes, of an uplink data volume of the terminal 200. Alternatively, the first data volume report includes information used to indicate a sum of the size of the uplink data volume of the first device and the size of the uplink data volume of the another device. For example, a sum of the sizes of the data volumes indicated in the first data volume report is 15 bytes. Optionally, the information about the size of the uplink data volume of the another device may include one or more pieces of information about sizes of uplink data volumes of the another device. The one or more pieces of information may be added and expressed by using one value, or may be separately listed.

It should be noted that information used to indicate a size of an uplink data volume of a device in this embodiment of this application may be a size of an uplink data volume of a device, may be an index associated with the size of the uplink data volume, or may be other content. This is not limited in this embodiment of this application. Table 1 shows an association relationship between an index and a size of a data volume.

TABLE 1

Association relationship between an index and a size of a data volume

| Index | Size of a data volume (unit: byte) |
|---|---|
| 0 | 0 |
| 1 | 0 to 50 |
| 2 | 51 to 100 |
| 3 | 101 to 150 |
| 4 | greater than 150 |

With reference to Table 1, it can be learned that when an index included in the first data volume report is 1, the access device may determine that a size of a data volume that is indicated by the first data volume report is 0 to 50 bytes. The index associated with the size of the uplink data volume is carried in the data volume report, so that signaling overheads can be reduced.

It should be noted that, in this embodiment of this application, there is an association relationship between an index and a size of a data volume of the access device and the first device.

It may be understood that when the first device reports the first data volume report to the access device, the access device may allocate an uplink resource to the first device based on a size of a data volume that is included in the first data volume report. Specifically, a size of the uplink resource allocated by the access device to the first device may be greater than the size of the data volume, or may be less than or equal to the size of the data volume. Therefore, when the first data volume report is used to indicate the size of the uplink data volume of the first device and the size of the uplink data volume of the another device, it is convenient for the access device to allocate an uplink resource to the first device based on the information used to indicate the size of the uplink data volume of the first device, preferentially schedule the first device, or allocate more uplink resources to the first device during each scheduling.

In still another form, the first data volume report includes a size of the uplink data volume of the first device and a size of an uplink resource allocated by the first device to the another device. For example, as shown in FIG. 2, a moment t1 in FIG. 2 is used as an example. It is assumed that a size of an uplink data volume of the RN 1 is five bytes, and a size of an uplink data volume of the RN 2 is 20 bytes. After the RN 2 sends a BSR to the RN 1, the RN 1 may schedule a 15-byte uplink resource for the RN 2. Therefore, after next uplink transmission, the RN 2 sends 15-byte data to the RN 1. In this case, impact caused by only the 15 bytes needs to be considered in the first data volume report sent by the RN 1 to the base station, that is, a sum of sizes of first data volumes sent by the RN 1 to the base station is 20 (that is, 5+15) bytes, instead of 25 (5+20) bytes.

In this form, the first data volume report includes information used to indicate the size of the uplink data volume of the first device and information used to indicate the size of the uplink resource allocated by the first device to the another device, or the first data volume report includes information used to indicate a sum of the size of the uplink data volume of the first device and the size of the uplink resource allocated by the first device to the another device. For example, the information used to indicate the size of the uplink data volume of the first device may be the size of the uplink data volume of the first device.

In yet another form, the first data volume report includes information used to indicate a size of the uplink data volume of the first device.

In addition, the first data volume report may include information used to indicate a size of the uplink data volume of the another device. In this case, the first data volume report may carry an identifier of the another device, so that when the access device receives the first data volume report, the access device determines that a data volume included in the first data volume report is the data volume of the another device. This helps the access device allocate more uplink resources to the first device, or increase a scheduling priority of the first device. The first device may further report a size of a local uplink data volume to the access device by using a BSR mechanism defined in LTE or NR.

In this embodiment of this application, the instruction information used to instruct the first device to report the received data volume report of the another device may be sent by the access device to the first device, or may be sent by the next-hop device of the first device to the first device. This is not limited in this embodiment of this application.

Specifically, when the access device determines that there are an abundant supply of idle resources, the instruction information used to instruct the first device to report the received data volume report of the another device may be sent by the access device to the first device. When the next-hop device (for example, the RN 301 shown in FIG. 5) of the first device determines that the data volume reporting condition is met, the instruction information used to instruct the first device to report the received data volume report of the another device may be sent by the next-hop device of the first device to the first device.

S102. The access device receives the first data volume report sent by the first device.

With reference to the content of the first data volume report, it may be learned that after step S102, the access device may perform any one or more of the following manners based on the first data volume report sent by the first device, to avoid congestion of data that occurs at the first device side:

Manner 1: An uplink resource is allocated to the first device. For example, more uplink resources may be allocated to the first device. Specifically, because a data volume reported in the first data volume report is greater than a data volume actually received by the first device at this time, more scheduling resources may be allocated to the first device.

Manner 2: A scheduling priority of the first device is increased.

Manner 3: A processing parameter of a logical channel priority (LCP) at the first device side is adjusted. Because a BSR may provide a logical channel group (LCG) granularity-based buffer status, a scheduling parameter of a logical channel (LCH) corresponding to each LCG may be adjusted. For example, a higher priority bit rate (PBR) may be configured for a DRB corresponding to "an LCG on which a combined BSR is sent".

Manner 4: An access policy of the first device is adjusted, for example, a terminal accessing the first device is limited.

Manner 5: A terminal accessing the first device is diverged to another relay device, to reduce participation of scheduling contention.

Manner 6: The first device establishes or reconfigures dual connectivity.

This embodiment of this application provides the method for sending a data volume report, and the first device has any one of the following data volume reporting conditions: the uplink data volume of the first device is greater than or equal to the first threshold, the uplink data volume of the first device is greater than or equal to the first threshold, and the time for which the uplink data volume of the first device is greater than or equal to the first threshold is greater than or equal to the first time threshold; the instruction information used to instruct the first device to report the received data volume report of the another device is received; at least one of the plurality of connections between the first device and the access device is disconnected; and the connection between the first device and the another access device is disconnected. In this way, when determining that the data volume reporting condition is met, the first device may actively send, to the access device, the first data volume report including the uplink data volume of the first device, the sum of the uplink data volume of the first device and the uplink data volume of the another device, or the uplink data volume of the another device, so that the access device preferentially schedules an uplink transmission resource for the first device, or schedules more resources based on the uplink data volume and the uplink data volume of the another device. In this way, when to-be-sent uplink data of the first device and uplink data of the another device that subsequently arrives can be sent in time, congestion caused at the first device when the to-be-sent uplink data that is to arrive at the first device and the uplink data volume of the first device are all aggregated at the first device can be avoided.

The data volume reporting condition in this embodiment of this application may be configured by the access device for the first device. For example, "the uplink data volume in this embodiment of this application is greater than or equal to the first threshold", and "the uplink data volume of the first device is greater than or equal to the first threshold, and the time for which the uplink data volume of the first device is greater than or equal to the first threshold is greater than or equal to the first time threshold" may be configured by the access device for the first device. Certainly, the data volume reporting condition may alternatively be a capability of the first device. For example, at least one of the plurality of links between the first device and the access device is disconnected, the connection between the first device and the another access device is disconnected, or the instruction information used to instruct the first device to report the received data volume report of the another device is received.

Therefore, before step S101, this embodiment of this application further includes the following step:

S103. The access device sends, to the first device, a message used to trigger the first device to send the first data volume report, where the message used to trigger the first device to send the first data volume report includes any one or more of the following: information used to indicate the first threshold, information used to indicate the first threshold and information used to indicate the first time threshold, and the instruction information used to instruct the first device to report the received data volume report of the another device.

Optionally, the first threshold is used by the first device to determine whether the data volume reporting condition is met. Specifically, when the uplink data volume of the first device is greater than or equal to the first threshold, the data volume reporting condition is met; or when the uplink data volume of the first device is greater than or equal to the first threshold, and the time for which the uplink data volume of the first device is greater than or equal to the first threshold is greater than or equal to the first time threshold, the data volume reporting condition is met.

Specifically, the access device may send, to the first device in a plurality of forms, the information used to indicate the first threshold, or the information used to indicate the first threshold and the information used to indicate the first time threshold. For example, in one aspect, when the access device is a base station, the access device may send, to the first device by using a system message, the information used to indicate the first threshold, or the information used to indicate the first threshold and the information used to indicate the first time threshold. In this way, all relay devices in the relay system use the same first threshold and the same first time threshold. In another aspect, the system information includes a plurality of pieces of information used to indicate the first threshold, or a plurality of pieces of information used to indicate the first threshold, information that corresponds to each piece of information used to indicate the first threshold and that is used to indicate the first time threshold, and an identifier of a device corresponding to each piece of information used to indicate the first threshold. In this way, each relay device in the relay system may determine, based on an identifier of the relay device, corresponding information used to indicate the first threshold. The identifier may uniquely identify the device, or may be a capability of the device. For example, the capability of the device may be a radio frequency bandwidth capability of the device. That is, an RN with a relatively large radio frequency bandwidth can support a larger transmission bandwidth, and can obtain more resources in each transmission. Correspondingly, a data volume that can be reduced in each buffer is relatively large. Therefore, the first threshold may be set to a relatively large value. In still another aspect, the access device may configure, for the first device by using dedicated signaling (for example, RRC), the information used to indicate the first threshold, or the information used to indicate the first threshold and the information used to indicate the first time threshold, or configure one first threshold for one or more logical channel groups of each relay device.

When the dedicated signaling is used, the first threshold and/or the first time threshold may be configured for a device (for example, configured for an RN), or may be configured for a logical channel group, a logical channel, or even a quality of service flow QoS flow of the RN. The first threshold and/or the first time threshold may be configured for one or more objects shown. The objects include devices, logical channels, logical channel groups, or quality of service flows.

Specifically, the first threshold of the first device may be determined based on the following conditions, and determined based on accumulation of uplink data volumes on all logical channels corresponding to all logical channel groups of the first device.

S104. The first device receives the message used to trigger the first device to send the first data volume report.

Specifically, the information used to indicate the first threshold may be a value that has a unit of byte, or may be an identifier associated with the first threshold. For example, a protocol predefines a plurality of groups of thresholds. When configuring a threshold for the first device, the access device uses an identifier corresponding to each threshold, for example, an ID. In this way, when receiving an identifier, the first device can determine a threshold corresponding to the identifier, as shown in FIG. 2 below:

TABLE 2

Association relationship between a threshold and an identifier

| ID | Threshold (Byte) |
|---|---|
| 1 | 100 |
| 2 | 200 |
| 3 | 300 |
| 4 | 400 |
| 5 | 500 |

Specifically, when the first device has a data volume reporting condition, the first device may further determine the data volume reporting condition based on the information used to indicate the first threshold, or the information used to indicate the first threshold and the information used to indicate the first time threshold, and the data volume reporting condition of the first device.

Figure 8:
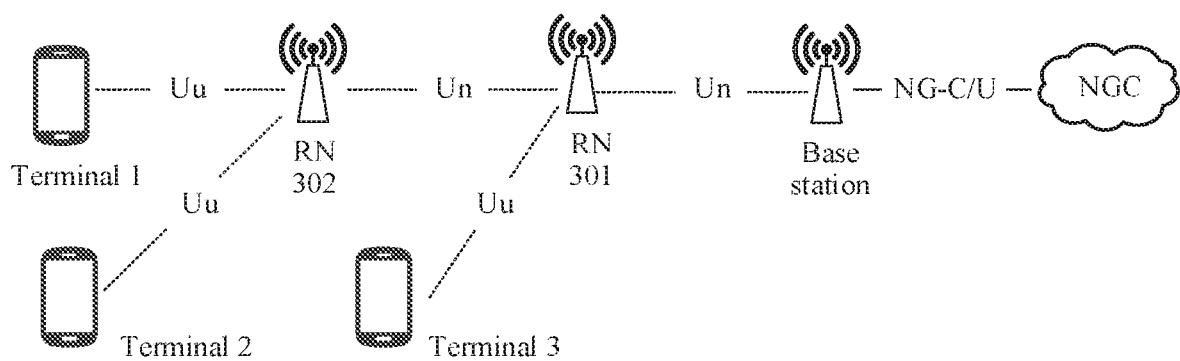
FIG. 8 is a schematic structural diagram of accessing different relay devices by a plurality of user equipments according to this application.

In a multi-hop relay scenario, as shown in FIG. 8, the RN 301 not only accesses a base station, but also provides a transmission relay for the RN 302, and the RN 301 also accesses some terminals, for example, a terminal 3 shown in FIG. 8. Compared with the RN 302, the RN 301 directly and indirectly serves more terminals, and is easier to be congested. Therefore, in this embodiment of this application, the access device may configure the first threshold and the first time threshold for the relay device that is easy to be congested. Therefore, before step S103, this embodiment of this application further includes the following step:

S105. If the access device determines that a quantity of devices served by any one of at least one fourth device is greater than or equal to a second threshold, the access device determines that the fourth device is the first device.

Specifically, that the access device determines that the quantity of devices served by any relay device in the at least one fourth device is greater than or equal to the second threshold may be performed in the following manners: Case 1: The access device performs determining based on a quantity of user equipments served by the fourth device. Case 2: The access device performs determining based on a quantity of QoS flows served by each fourth device. When the quantity of QoS flows served by the fourth device is greater than or equal to the second threshold, the access device determines that the fourth device is easy to be congested. Case 3: The access device performs determining based on a quantity of hops between the fourth device and a served terminal. A larger quantity of hops indicates more data of terminals that may be directly and/or indirectly served, and a higher probability of congestion.

The first device is determined by the access device. Therefore, for the first device, the first device needs to report, to the access device, information such as load (including a quantity of served user equipments or a quantity of served QoS flows) of the first device or a maximum quantity of relay hops supported by the first device. Optionally, the first device may report, to the access device, the information such as the load of the first device or the maximum quantity of relay hops supported by the first device when the first device is triggered by a request that is sent by the access device and that is used to query the load of the first device.

Optionally, in this embodiment of this application, before the first device sends the first data volume report to the access device, the method provided in this embodiment of this application further includes S106: The first device determines the first data volume report. Because implementations of step S106 in this embodiment of this application are slightly different in different scenarios in this embodiment of this application, the following separately describes the implementations of step S106 in the different scenarios. 3?

Figure 9:
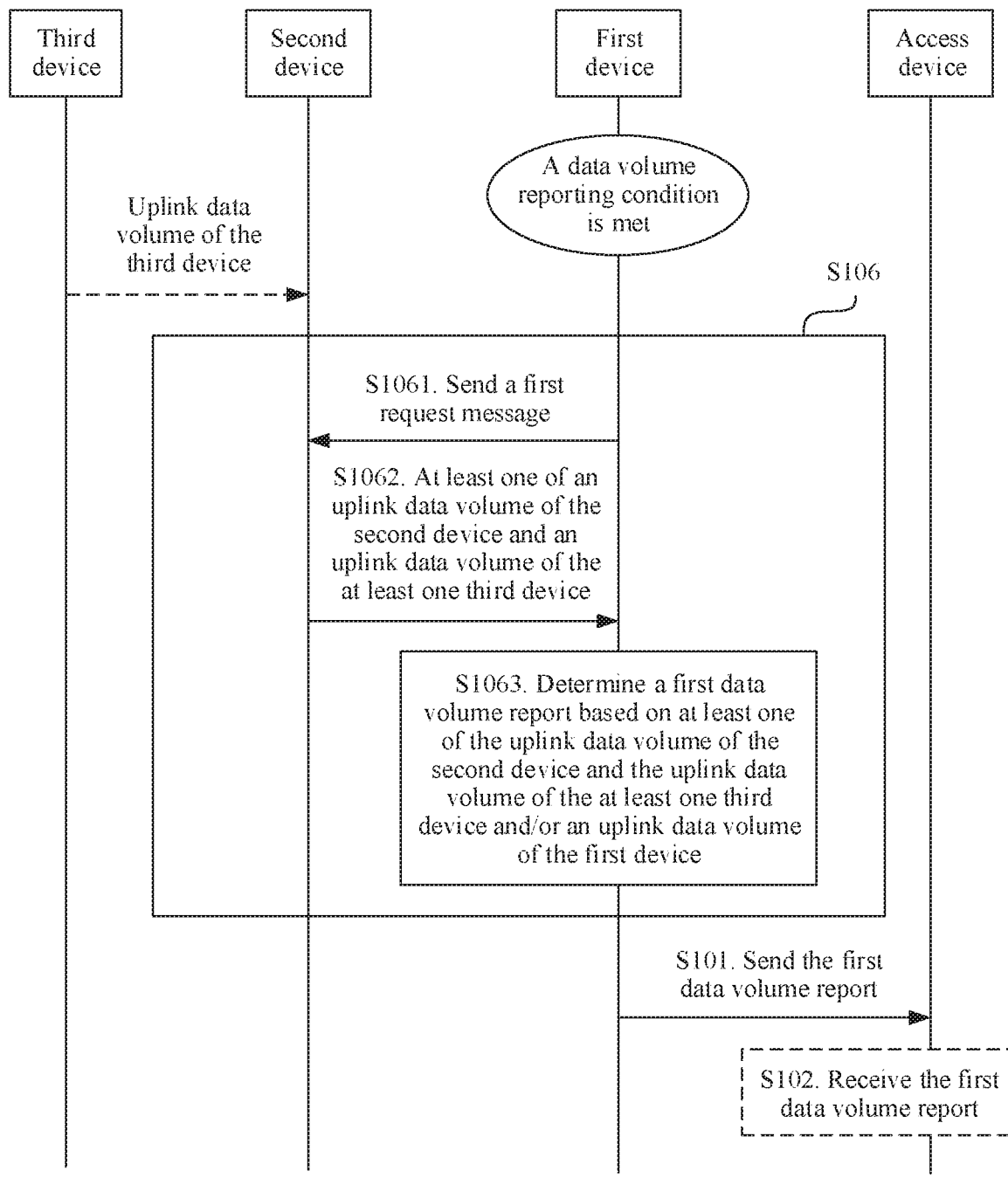
FIG. 9 is a schematic flowchart 2 of a method for sending a data volume report according to this application.

In a first scenario, when the first device determines that the data volume reporting condition is met, and the first device does not have the uplink data volume of the another device, as shown in FIG. 9, a possible implementation of step S106 is as follows:

S1061. The first device sends a first request message to a second device when the data volume reporting condition is met, where the first request message is used to instruct the second device to report at least one of an uplink data volume of the second device and an uplink data volume of at least one third device that is obtained by the second device.

In this embodiment of this application, the second device may be one or more devices connected to the first device. This is not limited in this embodiment of this application.

It may be understood that when the second device does not have a next-hop device, the uplink data volume of the at least one third device that is obtained by the second device is 0. For example, the first device is the RN 300 shown in FIG. 3, and the second device is the terminal 200 shown in FIG. 3.

Specifically, that the first device sends the first request message to the second device includes any one of the following: the first device sends the first request message to the second device by using a media access control (MAC) control element (CE), RRC signaling, and dedicated control information (for example, downlink control information (DCI)).

Specifically, the data volume reporting condition herein may be any one of the following: the uplink data volume of the first device is greater than or equal to the first threshold; the uplink data volume of the first device is greater than or equal to the first threshold, and the time for which the uplink data volume of the first device is greater than or equal to the first threshold is greater than or equal to the first time threshold; the instruction information used to instruct the first device to report the received data volume report of the another device is received; at least one of the plurality of connections between the first device and the access device is disconnected; and the connection between the first device and the another access device is disconnected.

S1062. The first device receives a second data volume report sent by the second device, where the second data volume report includes at least one of the uplink data volume of the second device and the uplink data volume of the at least one third device.

S1063. The first device determines the first data volume report based on at least one of the second data volume report and the uplink data volume of the first device.

For example, the first device determines the uplink data volume included in the second data volume report as the first data volume report, determines the uplink data volume of the first device as the first data volume report, or determines a sum of the uplink data volume included in the second data volume report and the uplink data volume of the first device as the first data volume report.

It should be noted that, when the first device has the second data volume report sent by the second device, steps S1061 and S1062 may be omitted, that is, S1061 and S1062 are optional. That is, when the first device determines that the data volume reporting condition is met (for example, the data volume reporting condition may be: the sum of the uplink data volume of the first device and the uplink data volume of the another device is greater than or equal to the first threshold; the sum of the uplink data volume of the first device and the uplink data volume of the another device is greater than or equal to the first threshold, and the time for which the sum of the uplink data volume of the first device and the uplink data volume of the another device is greater than or equal to the first threshold is greater than or equal to the first time threshold: a to-be-sent data volume of the another device that is received by the first device is greater than or equal to the first threshold; and the uplink data volume of the another device that is received by the first device is greater than or equal to the first threshold, and the time for which the uplink data volume of the another device that is received by the first device is greater than or equal to the first threshold is greater than or equal to the first time threshold), the first device directly determines the first data volume report based on at least one of the second data volume report and the uplink data volume of the first device.

Figure 10:
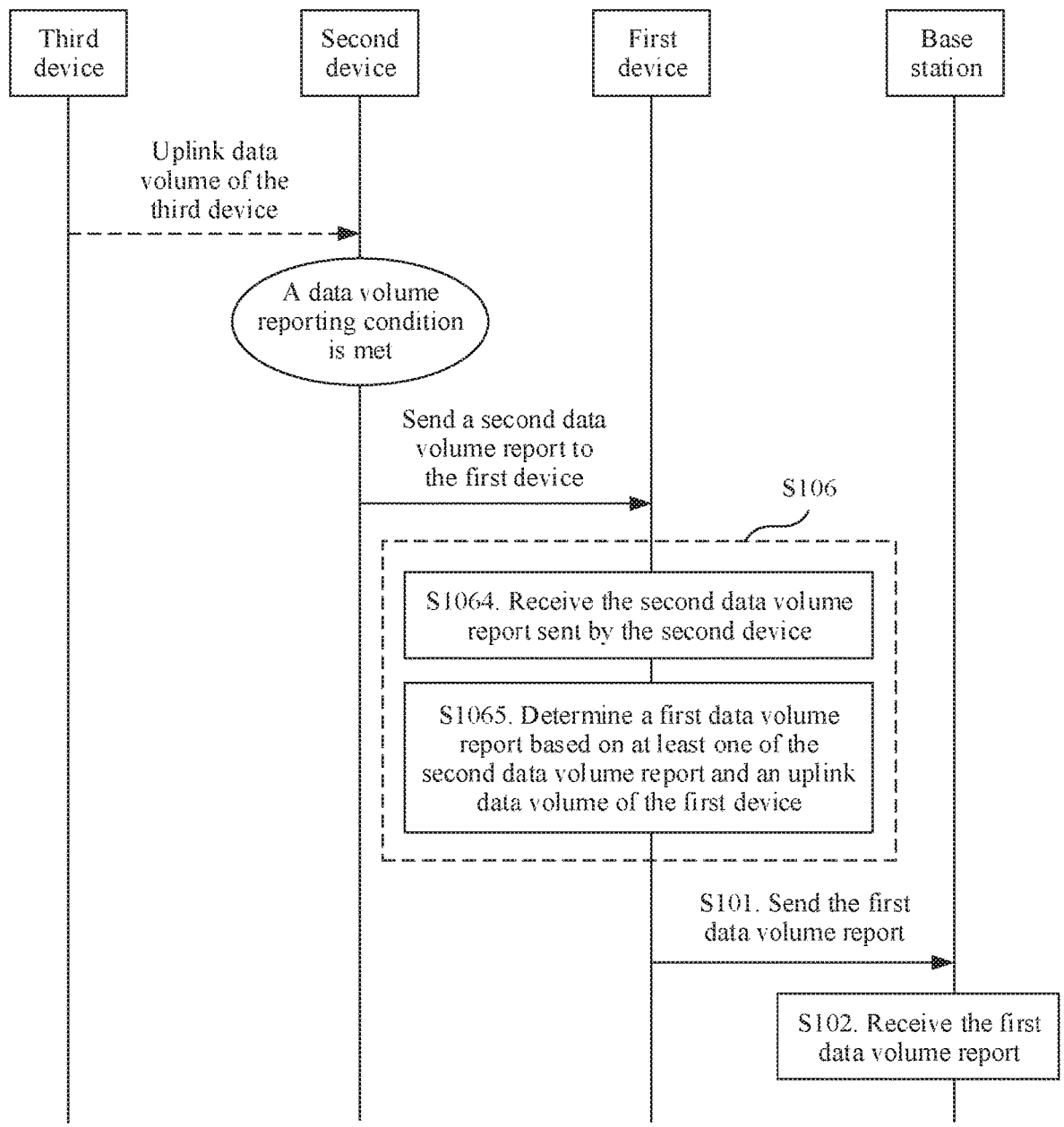
FIG. 10 is a schematic flowchart 3 of a method for sending a data volume report according to this application.

In a second scenario, when all relay devices in the relay system meet the data volume reporting condition, or some relay nodes meet the data volume reporting condition, a next-hop device of the first device, for example, the second device, may meet the data volume reporting condition. In this case, the second device needs to send, to the first device, at least one of the uplink data volume of the second device and the obtained uplink data volume of the at least one third device. Therefore, the first device needs to allocate an uplink resource to the second device. Although the uplink data volume of the first device at a current moment is not greater than or equal to the first threshold, or the first device does not have a threshold, it may be expected that more data arrives at the first device in a future time period. In this case, avoidance of congestion at the first device needs to be considered. Therefore, based on this second scenario, as shown in FIG. 10, another possible implementation of step S106 is as follows:

S1064. The first device receives a second data volume report sent by the second device, where the second data volume report is instruction information used to instruct the first device to report the received data volume report of the another device.

Specifically, it may be understood that before step S1064, the method further includes: sending, by the second device, the second data volume report to the first device when determining that the data volume reporting condition is met.

Specifically, when the second device sends the second data volume report to the first device, the first device needs to determine that the received second data volume report is the instruction information used to instruct the first device to report the received data volume report of the another device. Therefore, content of the second data volume report may be including a plurality of pieces of data volume report information for a same LCG. For example, one piece of data volume report information is a local uplink data volume of the second data and the uplink data volume of the at least one third device, or the data volume report carries a special identifier that is used to indicate that the data volume report is a combined data volume report. For example, in one aspect, the second data volume report includes the uplink data volume of the second device and a first identifier, where the first identifier is used to indicate that a format of the second data volume report is a combined data volume report. In another aspect, the second data volume report includes information used to indicate the uplink data volume of the second device and information used to indicate an uplink data volume of a terminal and/or an RN served by the second device. In still another aspect, the second data volume report includes information used to indicate the uplink data volume of the second device and information used to indicate a size of a scheduled uplink resource.

S1065. The first device determines the first data volume report based on at least one of the second data volume report and the uplink data volume of the first device.

It may be understood that, in the solution shown in FIG. 10, the data volume reporting condition may be the instruction information that is received by the first device and sent by the second device and that is used to instruct the first device to report the received data volume report of the another device.

In a third scenario, in this embodiment of this application, when each relay device in a relay system reports, to a base station, that the relay device has a capability of reporting a combined data volume report, the base station may actively send, to the first device, the instruction information used to instruct the first device to report the received data volume report of the another device. For example, when the base station finds that a transmission resource, especially an uplink transmission resource, is idle, if the base station determines that the first device has a function of reporting a combined data volume report, the base station may actively trigger the first device to report the first data volume report. In this case, when the first device does not have a size of a to-be-sent data volume of the another device, the first device may obtain the size of the to-be-sent data volume of the another device by using steps S1061 to S1062.

As shown in FIG. 6, there is a connection between the RN 300 and either of the base station and the RN 302, that is, the RN 300 is in a dual-connectivity state. Therefore, the RN 300 may perform data transmission with the base station and the RN 302. The RN 300 may send a data volume report to the base station and the RN 302 separately to obtain uplink resources from the base station and the RN 302, and then the RN 300 sends the to-be-sent uplink data to the base station and the RN 302 separately. When the connection between the RN 300 and either of the base station and the RN 302 is disconnected, for example, when the connection between the RN 300 and the base station is disconnected or failed, data is aggregated to the connection between the RN 300 and the RN 302 for transmission. Therefore, congestion at the RN 302 may be caused.

Specifically, in one aspect, the sending, by the first device, the first data volume report to the access device in this embodiment of this application may be implemented in the following manner:

S1011. When at least one of the plurality of connections between the first device and the access device is disconnected, the first device sends the first data volume report to the access device through a connected connection in the plurality of connections. For example, the first device establishes a plurality of connections to one access device. This is similar to a carrier aggregation scenario in LTE and NR, and each connection may correspond to one cell or one cell group (CG).

or

S1012. When the connection between the first device and the another access device is disconnected, the first device sends the first data volume report to the access device through a connection between the first device and the access device.

For example, the first device is connected to a plurality of access nodes. For details, refer to a dual connectivity architecture shown in FIG. 6. For a configuration of the dual connectivity, refer to dual connectivity defined in LTE or NR for details. One connection corresponds to a master cell group (MCG) or a master node (MN), and another connection corresponds to a secondary cell group (SCG) or a secondary node (SN).

For example, as shown in FIG. 6, an example in which the first device is the RN 300 is used. When the RN 300 determines that the connection between the RN 300 and the RN 302 is disconnected, the RN 300 determines that the data volume reporting condition is met. Therefore, the RN 300 sends the first data volume report to the base station through the connection between the RN 300 and the base station.

Specifically, the first device may determine, in the following manner, that the connection to the another access device is disconnected, that is, the connection fails:

In LTE, when an RRC layer/entity of the first device determines that a timer (for example, a timer T310 related to radio link monitoring (RLM)) expires, random access retransmission between the first device and the another access device reaches a maximum quantity of times, and automatic repeat request (ARQ) retransmission reaches a maximum quantity of times, the first device determines that the connection between the first device and the another access device is disconnected.

In NR, RLF processing of LTE is used as a baseline. Further, application of massive antennas is considered in NR. Especially in a high frequency scenario, a beam pair needs to be preconfigured for data communication between a base station and a terminal. Management of the beam pair is performed by Layer 1 (a physical layer) and/or Layer 2 (a MAC layer). Therefore, in NR, it may be determined, based on a beam failure, that the connection between the first device and the another access device is disconnected.

Specifically, the first device monitors a reference signal, and determines whether there is a beam failure. After a beam fails, beam scanning is required, and a beam failure recovery request (BFRR) is initiated to the access device or the another access device on a new beam. If a response from the access device or the another access device is received, beam failure recovery (BFR) succeeds. If the first device does not receive a response after sending the BFRR to the another access device for a plurality of times, it is considered that the BFRR process fails, and it is determined that the connection between the first device and the another access device is disconnected.

Figure 11:
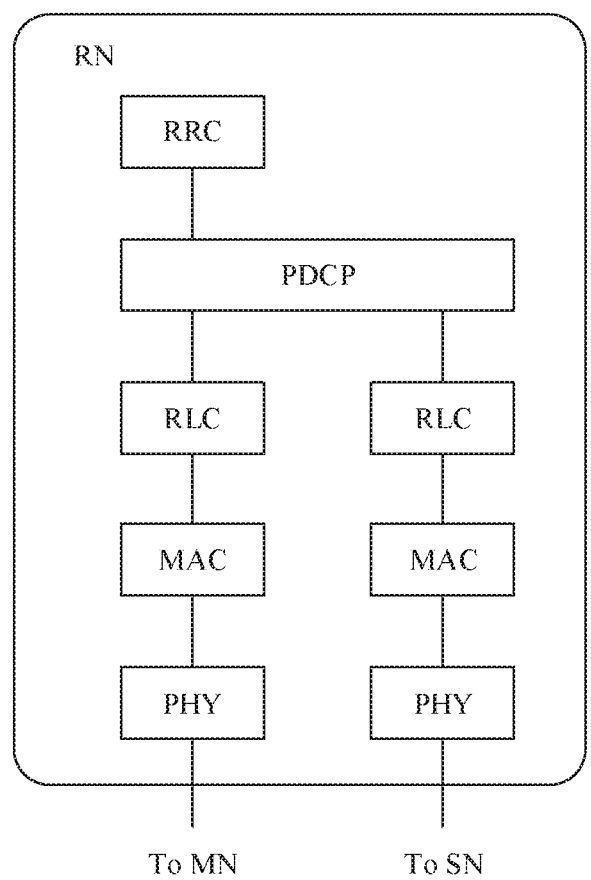
FIG. 11 is a schematic diagram of an internal structure of a relay device in a dual-connectivity architecture according to this application.

As shown in FIG. 6, the RN 300 may establish a connection to both a master base station (for example, the base station 100 in FIG. 6) and a secondary base station (which may also be referred to as a secondary access device such as the RN 302). Each of the RN 300 and the MN and the SN may have a MAC layer and a PHY layer. The RN 300 and the SN and the MN may have one PDCP layer, or the RN 300 may have a PDCP layer corresponding to PDCP layers of the SN and the MN. Certainly, there may be only one RRC layer between the RN 300 and the SN and the MN, or there may be one RRC layer corresponding to the SN and the MN. FIG. 11 shows a case in which the RN 300 and the SN and the MN have only one RRC layer and one PDCP layer.

It is assumed that a connection between the RN 300 and the MN or between the RN 300 and the SN is disconnected. Based on definitions of an RLF and a BF in the standard, a MAC/RRC entity (where the RRC entity may also be referred to as the RRC layer) at the first device side may determine, by using the following indications, that the connection at the first device side is disconnected:

Manner 1: The (MAC/RRC entity) receives a beam failure indication from a physical layer/MAC layer. In this case, connection disconnection can be identified in a timelier manner, but initiating a combined data volume report may slightly waste resources when the connection may be recovered in a subsequent process.

Manner 2: The (MAC/RRC entity) receives a beam recovery failure indication from the physical layer/MAC layer.

Manner 3: The (MAC/RRC entity) receives an RLF failure indication from the RRC layer.

Alternatively, an indication for determining an RLF may be directly accepted.

Manner 4: The (MAC/RRC entity) receives a message, from the RRC layer, indicating that T310 or T312 expires.

Manner 5: The (MAC/RRC entity) receives a message, from the MAC layer, indicating that random access retransmission reaches a maximum quantity of times.

Manner 6: The (MAC/RRC entity) receives a message, from the RLC layer, indicating that ARQ retransmission reaches a maximum quantity of times.

With reference to internal implementation of the first device node, a trigger mechanism is specified as follows:

1. (MAC to MAC) A MAC entity in which disconnection occurs first receives the indications in the foregoing manner 1 to manner 6, then generates a newly defined "connection disconnect indication", and sends the "connection disconnect indication" to another connected MAC entity. The foregoing trigger mechanism is specified as follows: The connected MAC entity receives a connection disconnect indication sent by the disconnected MAC entity.

2. (RRC to MAC) An indication generated by the RRC may further include the following:

2.1 (When there is one RRC), because the RRC layer may directly control the PHY/MAC/RLC layers, the RRC layer may directly send the connection disconnect indication to a normally working connection. The foregoing trigger mechanism is specified as follows: (The MAC entity) receives the connection disconnect indication in the manner 3 or manner 4.

2.2 (When there is one RRC layer on each connection), an RRC entity on a disconnected connection determines, based on an RLF mechanism, that the connection is disconnected, and sends a connection disconnect indication to an RRC entity on a connected connection. The RRC entity generates a newly defined "connection disconnect indication" and sends the "connection disconnect indication" to a MAC entity on another connection. The trigger mechanism is specified as follows: The MAC entity receives the connection disconnect indication (from the RRC entity).

Other types of data volume reports than the combined data volume report have been defined in LTE/NR. For example, the other types of data volume reports may be regular BSR, periodic BSR and padding BSR The other types of data volume reports are for regular scheduling processing. However, in this embodiment of this application, the combined data volume report is used to avoid congestion. Therefore, it may be considered that a sending priority higher than a sending priority of the other types of data volume reports is set for the combined data volume report. Therefore, the method provided in this embodiment of this application further includes: when there are the first data volume report and the other types of data volume reports, determining, by the first device, that the sending priority of the first data volume report is higher than the sending priority of the other types of data volume reports, where the type of the first data volume report is different from the other types.

For example, if the first device determines that a combined data volume report, a regular BSR, a periodic BSR, and a padding BSR are simultaneously triggered, or a combined data volume report (data size report, DSR), a regular BSR, a periodic BSR, and a padding BSR are already triggered, the first device preferentially sends the combined data volume report.

"Already triggered" indicates that there is not necessarily an uplink transmission resource at a moment at which a BSR is triggered. Therefore, the first device stores the triggered BSR and waits for an uplink transmission resource/uplink scheduling.

Because the padding BSR is triggered when there is a remaining uplink resource after service data scheduling is completed, the padding BSR does not exist together with the combined data volume report, the regular BSR, and the periodic BSR at the same time. In this case, when the first device determines that the combined data volume report, the regular BSR, the periodic BSR, and the padding BSR are already triggered, or when the combined data volume report, the regular BSR, the periodic BSR, and the padding BSR are being triggered, the first device preferentially sends the combined data volume report.

In addition, in this embodiment of this application, for the regular BSR, the periodic BSR, the padding BSR and the combined data volume report, these BSRs after being triggered are considered as pending BSRs until the BSRs are deleted or sent. Therefore, if the combined data volume report is triggered, a baseline is to retain a triggered BSR or a pending BSR. Further, because the regular BSR, the periodic BSR, and the combined data volume report have similar purposes of obtaining an uplink resource, it may be considered to delete the triggered regular BSR and periodic BSR. Specifically, the regular BSR and the periodic BSR may be deleted according to the following rule: If the combined data volume report is sent, the regular BSR and/or the periodic BSR that are triggered simultaneously or are already triggered may be deleted.

Each relay device may independently implement access of user equipment and configuration of a bearer, for example, a DRB. Therefore, when data of a same terminal (a same QoS flow) is sent from the terminal to a base station by using one or more RNs, the data may be transmitted on different DRBs at each hop. Correspondingly, a buffer status of data at each hop corresponds to a different logical channel group (LCG). Therefore, the relay device needs to associate buffer statuses of different hops of the terminal, that is, uplink data volumes, to form a combined DSR for different QoS flows.

Further, each QoS flow corresponds to a QoS requirement, or service data of each QoS flow corresponds to a QoS requirement. A QoS flow is mapped to different data radio bearers (DRB), different LCHs, or even different LCGs on different nodes/hop numbers. This also means that data having a same or similar QoS requirement is mapped to different DRBs or even different LCGs on different nodes/hop numbers. Therefore, buffer statuses of the data having a same QoS requirement needs to be associated. For example, as shown in Table 5, a terminal 1, a QFI #2, a terminal 2, and a QFI #1 are all mapped to an RN 1 and a DRB 2 (the RN 1 and an LCG 2). Therefore, when a BSR of the LCG 2 of the RN 1 is generated, the terminal 1, the QFI #2, the terminal 2, and the QFI #1 accumulates data volumes, to obtain a same DSR of an LCG of the RN 1, that is, an uplink data volume of data having a same QoS requirement. Therefore, buffer statuses of different hop numbers, that is, uplink data volumes, need to be associated to form a combined BSR for different QoS requirements. Based on a mapping relationship between an LCG and a QoS flow and a QoS requirement of the QoS flow, the QoS requirement corresponding to each LCG may be obtained. After receiving a combined DSR of each LCG, a DSR corresponding to each QoS requirement is known.

QoS includes parameters such as a packet loss rate and a transmission delay. "Same QoS requirement" may mean that parameters corresponding to the QoS are the same. "Similar" may be that some parameters are the same, or a difference between some or all parameters falls within a specific range For ease of description, the following describes a solution only by using a QoS flow as an object.

As shown in FIG. 8, the terminal 1 and the terminal 2 access the RN 302, the RN 302 accesses the RN 301, the RN 301 accesses the base station, the base station forwards data of the terminal to the core network, and the terminal 3 accesses the RN 301. Table 3 shows an air interface transmission path of a QoS flow, that is, DRB mapping between QoS flows of the terminal 1 and the terminal 2 and each hop):

TABLE 3

| | Air interface transmission path of a QoS flow | | |
|---|---|---|---|
| | DRB between the terminal and the RN 302 | Interface between the RN 302 and the RN 301 | Interface between the RN 301 and the base station |
| Terminal 1, QFI #1 | Terminal 1, DRB 1 (Terminal 1, LCG 1) | RN 302, DRB 2 (RN 302, LCG 2) | RN 301, DRB 1 (RN 301, LCG 1) |
| Terminal 1, QFI #2 | Terminal 1, DRB 2 (Terminal 1, LCG 2) | RN 302, DRB 1 (RN 302, LCG 1) | RN 301, DRB 2 (RN 301, LCG 2) |
| Terminal 2, QFI #1 | Terminal 2, DRB 1 (Terminal 2, LCG 1) | RN 302, DRB 1 (RN 302, LCG 1) | RN 301, DRB 2 (RN 301, LCG 2) |

It can be learned from Table 3 that a DRB allocated by the RN 302 to the QFI #1 of the terminal 1 is the DRB 1, and the DRB 1 allocated by the RN 302 to the QFI #1 of the terminal 1 belongs to the LCG 1; a DRB allocated by the RN 301 to the RN 302 is the DRB 2, and the DRB allocated by the RN 301 to the RN 302, namely, the DRB 2, belongs to the LCG 2: and a DRB allocated by the base station to the RN 301 is the DRB 1, and the DRB 1 allocated by the base station to the RN 301 belongs to the LCG 1. For allocation relationships of other QFIs, refer to the description of the QFI #1 of the terminal 1. Details are not described subsequently in this embodiment of this application. As shown in Table 4:

TABLE 4 shows an air interface transmission
path of a QoS flow of the terminal 3

|  | Interface between the terminal 3 and RN 301 | Interface between the RN 301 and the DgNB |
|---|---|---|
| Terminal 3, QFI #1 | Terminal 3, DRB 2 (Terminal 3, LCG 2) | RN 301, DRB 1 (RN 301, LCG 1) |

In a possible resource configuration manner, because each relay device receives a configuration of a previous hop, and configures information such as a DRB for a directly accessed device, it may be determined that the information managed by each relay device is as follows:

TABLE 5

Bearer configuration managed by the RN 302

|  | Interface between the terminal and the RN 302 | Interface between the RN 302 and the RN 301 |
|---|---|---|
| Terminal 1, QFI #1 | Terminal 1, DRB 1 (Terminal 1, LCG 1) | RN 302, DRB 2 (RN 302, LCG 2) |
| Terminal 1, QFI #2 | Terminal 1, DRB 2 (Terminal 1, LCG 2) | RN 302, DRB 1 (RN 302, LCG 1) |
| Terminal 2, QFI #1 | Terminal 2, DRB 1 (Terminal 2, LCG 1) | RN 302, DRB 1 (RN 302, LCG 1) |

As shown in FIG. 6, because the RN 301 does not ha %, eQoS flow information of the terminal 1 and the terminal 2. Table 6 shows bearer configurations managed by the RN 301.

TABLE 6

Bearer configuration managed by the RN 301

|  | Interface between the RN 302/terminal 3 and the RN 301 | Interface between the RN 301 and the base station |
|---|---|---|
| RN 302 | RN 302, DRB 2 (RN 302, LCG 2) RN 302, DRB 1 (RN 302, LCG 1) | RN 301, DRB 1 (RN 301, LCG 1) RN 301, DRB 2 (RN 301, LCG 2) |
| Terminal 3, QFI #1 | Terminal 3, DRB 2 (Terminal 3, LCG 2) | RN 301, DRB 1 (RN 301, LCG 1) |

Because the base station does not have QoS flow information of the terminal 1, the terminal 2, and the terminal 3, and does not have information about a DRB configured by the RN 301 for the RN 302 and the terminal 3, bearer configuration managed by the base station is shown in Table 7:

TABLE 7

Bearer configuration for base station management

|  | Interface between the RN 301 and the base station |
|---|---|
| RN 301 | RN 301, DRB 1 (RN 301, LCG 1) RN 301, DRB 2 (RN 301, LCG 2) |

Therefore, when the RN 301 generates a combined data volume report, the combined data volume report not only includes an uplink data volume of the RN 301 (a data volume already received from the RN 302 and the terminal 3), and an uplink data volume of a terminal/RN directly served by the RN 301 (for example, a BSR of the RN 302 and a BSR of the terminal 3), but also includes a BSR of an indirectly served terminal (for example, a data volume report of the terminal 1 and a data volume report of the terminal 2). In this case, that the RN 301 generates the combined data volume report ma be determined in the following manner:

Case 1: When the RN generates a combined data volume report, the combined data volume report only includes a local uplink data volume and an uplink data volume of a directly served device.

DSR_sum=DSR_RN 301+DSR_RN 302+DSR_terminal 3. DSR_sum indicates a size of a data volume in the combined data volume report. DSR_RN 302 indicates a size of a to-be-sent data volume reported by the RN 302 to the RN 301 (including a size of a to-be-sent data volume of the RN 302 and sizes of to-be-sent data volumes of the terminal 1 and the terminal 2). DSR_terminal 3 is a size of a to-be-sent data volume reported by the terminal 3 to the RN 301.

Because the RN 301 allocates a DRB to each of the RN 302 and the terminal 3, the RN 301 may determine a DRB configuration and an LCG configuration (for example, a bearer configuration managed by the RN 301, the second column) of the RN 302 and the terminal 3. In addition, the RN 301 receives a DRB and an LCG that are configured by the base station for the RN 301.

Therefore, the RN 301 may associate a DRB and a DRB or an LCG and an LCG of two adjacent hops, to form an appropriate DSR without requiring additional information, as shown in Table 8 and Table 9:

TABLE 8

DRB mapping relationship managed by the RN 301

| Interface between the RN 302/terminal 3 and the RN 301 | Interface between the RN 301 and the base station |
|---|---|
| RN 302, DRB 2 | RN 301, DRB 1 |
| RN 302, DRB 1 | RN 301, DRB 2 |
| Terminal 3, DRB 2 | RN 301, DRB 1 |

TABLE 9

LCG mapping relationship managed by the RN 301

| Interface between the RN 302/terminal 3 and the RN 301 | Interface between the RN 301 and the base station |
|---|---|
| RN 302, LCG 2 | RN 301, LCG 1 |
| RN 302, LCG 1 | RN 301, LCG 2 |
| Terminal 3, LCG 2 | RN 301, LCG 1 |

A combined DSR formed by the RN 301 includes buffer status information of the following LCGs:

DSR_sum_LCG 1 (allocated by the base station)= DSR_RN 301_LCG 1+DSR_RN 302_LCG 2+DSR_terminal 3_LCG 2. DSR_sum_LCG 1 represents a total combined DSR of the LCG 1 allocated by the base station. DSR_RN 301_LCG 1 represents a combined DSR of the LCG 1 of the RN 301. DSR_RN 302_LCG 2 represents a combined DSR of the LCG 2 of the RN 302. DSR_terminal 3_LCG 2 represents a combined DSR of the LCG 2 of the terminal 3.

DSR_sum_LCG 2 (allocated by the base station)= DSR_RN 301_LCG 2+BSR_RN 302_LCG 1. DSR_sum_LCG 2 indicates a total DSR of the LCG 1.

DSR_RN 301_LCG 2 indicates a combined DSR of the LCG 2 of the RN 301 BSR_RN 302_LCG 1 represents a combined DSR of the LCG 1 of the RN 302.

Case 2: When the RN generates a combined data volume report, the combined data volume report includes: (1) a local uplink data volume, (2) an uplink data volume of a directly served device and an uplink data volume of an indirectly served device.

In this case, an additional information and information exchange mechanism may be introduced in the manner of generating the combined DSR DSR_sum=DSR_RN 301+DSR_RN 302_sum (including DSR_terminal 1, DSR_terminal 2)+DSR_terminal 3. DSR_RN 302 is a buffer status report reported by the RN 302 to the RN 301, DSR_terminal 3 is a buffer status report reported by the terminal 3 to the RN 301, DSR_terminal 1 is a buffer status report reported by the terminal 1 to the RN 302, and BSR_terminal 2 is a buffer status report reported by the terminal 2 to the RN 302.

Specifically, the following two solutions may be included:

Case 2.1: The combined DSR is accumulated hop by hop.

For example, the RN 302 first associates information required by a local combined DSR, and reports the information to the RN 301. The RN 301 generates the local combined DSR based on the processed combined DSR reported by the RN 302. Descriptions are as follows:

(1) Reporting by the RN 302

The RN 302 may identify a mapping relationship similar to that of the RN 301 (as shown in Table 10 and Table 11). Therefore, a DSR may be generated according to local information:

DSR_RN 302_sum_LCG 1 (allocated by the RN 301)=DSR_RN 302_LCG 1+DSR_terminal 1_LCG 2+DSR_terminal 2_LCG 3. DSR_RN 302_LCG 1 indicates a local combined data volume report of the LCG 1 of the RN 302. DSR_terminal 1_LCG 2 represents a combined data volume report of the LCG 2 of the terminal 1. DSR_RN 302_sum_LCG 1 indicates a combined data volume report generated by the RN 302. DSR_terminal 2_LCG 3 indicates a combined data volume report of the LCG 3 of the terminal 2.

DSR_RN 302_sum_LCG 2 (allocated by RN 301)=DSR_RN 302_LCG 2+DSR_terminal 1_LCG 2.

TABLE 10

| DRB mapping relationship managed by the RN 302 | |
|---|---|
| Interface between the terminal and the RN 302 | Interface between the RN 302 and the RN 301 |
| Terminal 1, DRB 1 | RN 302, DRB 2 |
| Terminal 1, DRB 2 | RN 302, DRB 1 |
| Terminal 2, DRB 1 | RN 302, DRB 1 |

TABLE 11

| LCG mapping managed by the RN 302 | |
|---|---|
| Interface between the terminal and the RN 302 | Interface between the RN 302 and the RN 301 |
| Terminal 1, LCG 1 | RN 302, LCG 2 |
| Terminal 1, LCG 2 | RN 302, LCG 1 |
| Terminal 2, LCG 1 | RN 302, LCG 1 |

(2) Processing by the RN 301

The mapping relationship shown in Table 9 or Table 8 is used: BSR_RN 301_sum_LCG 1 (allocated by the base station)=BSR_RN 302_sum_LCG 2+BSR_RN 301_LCG 1+BSR_terminal 3_LCG 1. BSR_RN 301_sum_LCG 1 indicates a data volume report of the LCG 1 of the RN 301. BSR_RN 302_sum_LCG 2 indicates a data volume report of the LCG 2 of the RN 302. BSR_RN 301_LCG 1 indicates a data volume report of the LCG 1 of the RN 301 BSR_terminal 3_LCG 1 indicates a data volume report of the LCG 1 of the terminal 3.

Therefore, an identifier of the RN 301 and an LCG identifier need to be used when the RN 301 generates a combined BSR. When the RN 301 reports the BSR, at least the following content is included: a size of a to-be-sent data volume and an LCG identifier. Further, the combined BSR may further include a node identifier.

Case 2.2: A Node that Finally Reports the BSR Accumulates the Information. Information Other than the BSR is Required to Assist Calculation of the Combined BSR.

For example, the RN 302 does not accumulate BSRs, but records BSRs of served terminals (for example, the terminal 1 and the terminal 2) and a local buffer status in the combined BSR for the RN 301. Then, the RN 301 generates a BSR corresponding to an LCG based on a mapping relationship between a DRB or the LCG.

Because the processing by the RN 302 is configured by a user (where a mapping method and a criterion depend on independent implementation of a device vendor), and the RN 301 does not have the information, the RN 302 needs send, to the access node RN 1, the following relationships that are shown in Table 2 and Table 3 and that are generated by the RN 302: (1) a mapping relationship between each QoS flow and a DRB, (2) a mapping relationship between a DRB and an LCH, (3) a mapping relationship between a DRB/LCH and an LCG, and/or (4) a mapping relationship between an LCG allocated by the RN 2 to the terminal and an LCG allocated by the RN 1 to the RN 2 (where the access node may further send, to another access node, a mapping relationship between each QoS flow and a DRB of each terminal, a mapping relationship between DRBs, and a mapping relationship between each DRB/LCH and an LCG.)

In this embodiment of this application, the first device may obtain, in the following process, the mapping relationship between each QoS flow and a DRB of each terminal, the mapping relationship between DRBs, and the mapping relationship between each DRB/LCH and an LCG that are sent by the second device:

In one manner, the foregoing relationships are obtained in a bearer management process.

For example, the first device configures and modifies a bearer for user equipment, or when RN configures/reconfigures a bearer, the RN exchanges information with the access device.

In another manner, when determining that the data volume reporting condition is met, the second device sends, to the first device, the mapping relationship between each QoS flow and a DRB of each terminal, the mapping relationship between QoS flows, and the mapping relationship between each DRB/LCH and an LCG; or when determining that the data volume reporting condition is met, the first device sends a third request message to the second device, where the third request message includes (1) a mapping relationship between each QoS flow and a DRB, (2) a mapping relationship between a DRB and an LCH, (3) a mapping relationship between each DRB/LCH and an LCG, and/or (4) a mapping relationship between an LCG allocated by the RN 2 to the terminal and an LCG allocated by the RN 1 to the RN 2.

Specifically, the mapping relationship may be sent by using a signaling format used in a bearer management process or a third request message, that is, a newly defined RRC information element (information element, IE), or may be carried in RRC signaling (for example, an RRC connection configuration message or an RRC connection configuration complete message). Alternatively, new RRC signaling is defined for exchanging the mapping relationship, or a new MAC CE, a MAC CE of an extended BSR, or the RRC signaling is defined.

In conclusion, the first data volume report provided in this embodiment of this application includes an uplink data volume corresponding to each quality of service flow.

The method provided in this embodiment of this application further includes: determining, by the first device, the uplink data volume corresponding to each quality of service flow based on a mapping relationship between each quality of service flow and a corresponding data radio bearer DRB and a mapping relationship between the DRB and a logical channel or a logical channel group.

For example, as shown in FIG. 8, Table 4 is used as an example to describe how the RN 301 generates the combined BSR of the LCG 1:

When the RN 301 generates the combined BSR of the LCG 1 (reported to the base station), if an uplink data volume of an indirect served terminal needs to be included, processing may be performed in the following manner:

BSR_sum_LCG 1_temp=BSR_RN 302_LCG 2+BSR_terminal 3_LCG 2.

BSR_sum_LCG 1temp indicates a combined BSR of the LCG 1 that is generated by the RN 301. BSR_RN 302_LCG 2 indicates a combined BSR of the LCG 2 that is generated by the RN 302 directly served by the RN 301. BSR_terminal 3_LCG 2 indicates a combined BSR of the LCG 2 generated by the terminal 3 directly served by the RN 301.

For terminals indirectly served by the RN 301, the RN 301 obtains an LCG mapping table (as shown in Table 10) managed by the RN 302, BSRs of the terminal 1 and the terminal 2, and an LCG mapping table (as shown in Table 8) locally maintained by the RN 301. Therefore, BSR_sum_LCG 1=BSR_RN 302_LCG 2+BSR_terminal 3_LCG 2+BSR_terminal 1_LCG 1.

As shown in FIG. 7, when the first device has dual connectivity, the method provided in this embodiment of this application further includes the following steps.

S107. The access device sends a first message to the first device, where the first message is used by the first device to determine a proportion of a data volume sent to the access device in a data volume to be reported by the first device.

Optionally, the first message is further used by the first device to determine a proportion of a data volume sent to the another access device in the data volume to be reported by the first device.

Specifically, the base station may send the first message to the first device in a process in which the first device establishes dual connectivity. The first message may be a newly defined message, or may be an existing signaling message in a process in which the first device establishes the dual connectivity. This is not limited in this embodiment of this application.

In one aspect, the first message may be a proportional relationship sent by the access device (for example, the base station) to the first device. In other words, the access device sends a proportional relationship to the first device. The proportional relationship includes information used to indicate the proportion of the data volume sent by the first device to the access device in the data volume to be reported by the first device.

Optionally, the proportional relationship further includes information used to indicate the proportion of the data volume sent by the first device to the another access device in the data volume to be reported by the first device.

For example, the proportional relationship may be (1/3, 2/3) or (1, 1). 1, 1 indicates that a size of the data volume sent to the access device is the same as a size of the data volume sent to the another access device.

For example, based on FIG. 6, the proportional relationship is (1/3, 2/3), and the size of the data volume to be reported by the first device is 30 bytes. In this case, the first device determines that a size of a data volume to be sent to the base station 100 is 10 bytes, and a size of a data volume to be sent to the RN 302 is 20 bytes.

In another aspect, the access device sends at least one first allocation proportion to the first device. The at least one first allocation proportion is used by the first device to determine the proportion of the data volume sent to the access device in the data volume to be reported by the first device. In this way, the first device may determine, with reference to the data volume in the first data volume report, the size of the data volume sent to the access device and the size of the data volume sent to the another access device.

For example, when the access device sends a first allocation proportion to the first device, the first device determines that the first allocation proportion is the proportion of the data volume sent to the access device in the data volume to be reported by the first device, and determines that a remaining data volume is the data volume sent to the another access device. The remaining data volume is a data volume other than the data volume that is determined to be sent to the access device by the first device and that is in the data volume to be reported by the first device.

For example, if the access device sends a first allocation proportion which is 1/5 to the first device, the first device determines that the proportion of the data volume sent to the another access device in the data volume to be reported by the first device is 4/5.

When the access device sends two or more first allocation proportions to the first device, the first device may determine, based on a quality parameter of the connection between the first device and the access device and a quality parameter of the connection between the first device and the another access device, the proportion of the data volume sent to the access device in the data volume to be reported by the first device, and determines the proportion of the data volume sent to the another access device in the data volume to be reported by the first device. Specifically, if the first device determines that quality of the link between the first device and the access device is better than quality of the link between the first device and the another access device, the first device determines a greater first allocation proportion of the two or more first allocation proportions as the proportion of the data volume sent to the access device in the data volume to be reported by the first device. For example, as shown in Table 12:

TABLE 12

Proportions of data volumes separately sent by the
first device in a dual-connectivity architecture

| | Proportion (x, y), and y is selected for a connection with good link quality |
|---|---|
| \|RSRP_leg 1 − RSRP_leg 2\| <= 5 dB | (½, ½) |
| 5 dB < \|RSRP_leg 1 − RSRP_leg 2\| < 10 dB | (½, ⅔) |
| 10 dB < \|RSRP_leg 1 − RSRP_leg 2\| <= 15 dB | (⅕, ⅘) |
| 15 dB < \|RSRP_leg 1 − RSRP_leg 2\| | (0, 1) |

Table 12 is described by using an example in which the quality parameter of the link is a reference signal receiving power (RSRP). Specifically, when the first device determines that an absolute value of a difference between the quality parameter of the link between the first device and the access device and the quality parameter of the link between the first device and the another access device is less than or equal to 5 dB, the first device determines 1/2 as an allocation proportion of the data volume sent by the first device to the access device in the first data volume report, and determines 1/2 as the allocation proportion of the data volume sent by the first device to the another access device in the first data volume report.

Optionally, in another implementation, the first device may preconfigure a proportional relationship, or use a proportional relationship agreed on in a protocol. In one aspect, the proportional relationship includes the information used to indicate the proportion of the data volume sent by the first device to the access device in the data volume to be reported by the first device, and the information used to indicate the proportion of the data volume sent by the first device to the another access device in the data volume to be reported by the first device. In another aspect, the proportional relationship includes at least one first allocation proportion. A use manner of the proportional relationship is consistent with a manner used when the access device configures the proportional relationship.

S108. The first device receives the first message sent by the access device.

Based on steps S107 and S108, the first device may determine a size of a data volume included in the data volume report sent to each of the access device and the another access device in the dual connectivity architecture, to report the data volume to each of the access device and the another access device.

In this embodiment of this application, the data volume to be reported by the first device may be the uplink data volume of the first device, may be the sum of the uplink data volume of the first device and the uplink data volume of the another device, or may be the uplink data volume of the another device. Specifically, when the first device is in the dual connectivity, the first device may determine, with reference to the data volume to be reported by the first device and the first message or the at least one first allocation proportion, the size of the data volume included in the first data volume report.

For example, when the uplink data volume of the first device is 10 bytes, and the uplink data volume of the another device is 20 bytes, the data volume to be reported by the first device is 30 bytes. When the first device determines that the proportion of the data volume sent to the access device is 1/3, the first device determines that the size of the data volume included in the first data volume report sent to the access device is 10 bytes. Therefore, the first data volume report may carry the information used to indicate the size of the uplink data volume of the first device. For another example, if the first device determines that a proportion of the data volume sent to the access device is 1, and the proportion of the data volume sent to the another access device in the data volume to be reported by the first device, when the first device determines that the uplink data volume of the first device and the uplink data volume of the another device need to be reported, the first data volume report carries the information used to indicate the size of the uplink data volume of the first device, and carries the information used to indicate the size of the uplink data volume of the another device.

It should be noted that, in this embodiment of this application, when the first device is in dual connectivity, the access device may further send a third message to the first device. The third message is used by the first device to determine to report the uplink data volume of the first device to the access device, and send the uplink data volume of the another device to the another access device. Alternatively, the third message is used by the first device to determine to send the uplink data volume of the first device to the another access device, and is used by the first device to determine to send the uplink data volume of the another device to the first device.

In addition, based on FIG. 7, data of the RN 30 may be directly sent to the base station, or may be forwarded to the base station by using the RN 302. After receiving a combined data volume report, the RN 302 may continue to send the combined data volume report to the base station. In this case, the combined data volume report received by the base station includes two times a combined data volume report sent by the RN 300, and the base station may directly or indirectly schedule an uplink resource for the RN 300 on the two connections, which may cause resource waste. Therefore, to avoid the resource waste, if the first device in this embodiment of this application has configured the first threshold in the foregoing embodiment before establishing the dual connections, after the first device has the dual connections, the first device may multiply the first threshold by a preset multiple, to determine a target first threshold.

Specifically, when at least one of the first threshold and the first time threshold is configured for the first device, the first device may multiply the at least one of the first threshold and the first time threshold by a preset multiple, to determine a target first threshold and a target first time threshold.

For example, when the first threshold is configured for the first device, the first device multiplies the first threshold by a preset multiple; when the first time threshold is configured for the first device, the first device multiplies the first time threshold by a preset multiplier; or when the first time threshold and the first threshold are configured for the first device, the first device multiplies the first time threshold by a preset multiple or multiplies the first threshold by a preset multiple, or multiplies the first time threshold by a preset multiple and multiplies the first threshold by a preset multiple.

In another aspect, there may be at least one connection between the first device and the access device, and the connection is applicable to a carrier aggregation (CA) scenario. Therefore, the method provided in this embodiment of this application further includes the following steps:

S109. The access device sends a second message to the first device, where the second message is used by the first device to determine a proportion of a data volume sent on each of the plurality of connections in the data volume to be reported by the first device.

S110. The first device receives the second message from the access device.

Based on this, the first device may determine the data volume sent to the access device on each connection. In this way, the access device needs to accumulate the data volume received on the at least one connection, to receive the first data volume report.

Certainly, alternatively, when there may be at least one connection between the first device and the access device, the access device may further configure at least one second allocation proportion for the first device. The at least one first allocation proportion is used by the first device to determine the proportion of the data volume sent on each of the plurality of connections in the data volume to be reported by the first device. Specifically, the first device may determine the first allocation proportion for each connection based on a quality parameter of each connection, and determine, based on the size of the data volume to be reported by the first device and the first allocation proportion of each connection, the size of the data volume sent on each connection.

The foregoing mainly describes the solutions provided in the embodiments of this application from a perspective of interaction between the network elements. It may be understood that, to implement the foregoing functions, all network elements, for example, the first device and the access device, include a corresponding hardware structure and/or software module for performing each function. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the first device and the second device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in this embodiment of this application, module division is exemplary, and is merely logical function division. In actual implementation, another division manner may be used. Descriptions are provided below by using an example in which function modules are obtained through division based on corresponding functions.

Figure 12:
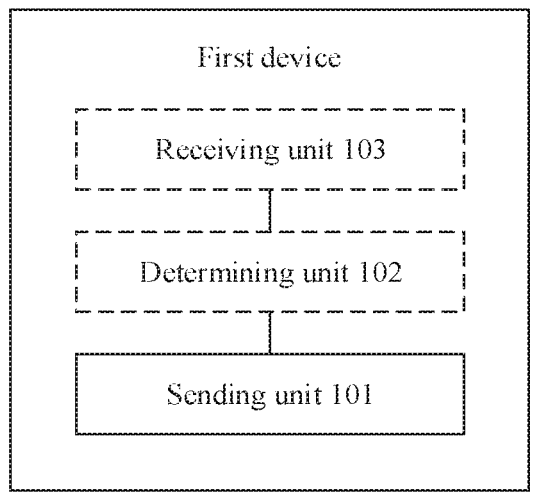
FIG. 12 is a schematic structural diagram 1 of a first device according to this application.

When an integrated unit is used, FIG. 12 is a possible schematic structural diagram of the first device in the foregoing embodiments. The first device includes a sending unit 101. The sending unit 101 is configured to support the first device in performing step S101 in the foregoing embodiment.

Optionally, the sending unit is specifically configured to support the first device in performing S1011, S1012, and S1061 in the foregoing embodiment.

In addition, the first device may further include a determining unit 102 and a receiving unit 103. The determining unit 102 is configured to support the first device in performing steps S106, S1063, and S1065 in the foregoing embodiment. The receiving unit 103 is configured to support the first device in performing steps S1062, S1064, S108, and S110 in the foregoing embodiment. All related content of the steps in the foregoing method embodiments may be cited in the function descriptions of the corresponding function modules. Details are not described herein again.

Based on hardware implementation, the sending unit 101 in this embodiment of this application may be a transmitter of the first device, the receiving unit 103 may be a receiver of the first device, and the transmitter may be usually integrated with the receiver to serve as a transceiver. A specific transceiver may also be referred to as a communications interface or a transceiver circuit. The determining unit 102 may be integrated into a processor of the first device.

Figure 13:
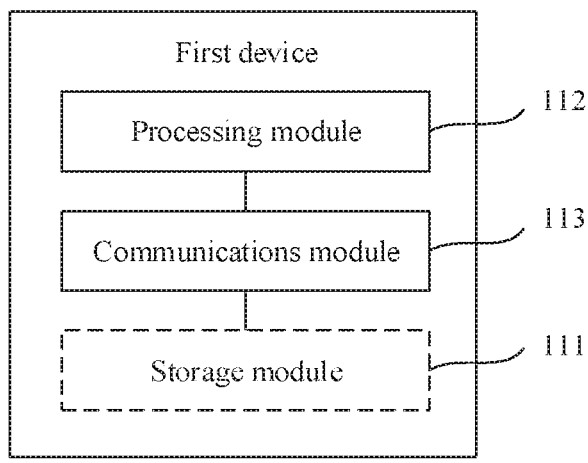
FIG. 13 is a schematic structural diagram 2 of a first device according to this application.

When an integrated unit is used, FIG. 13 is a schematic diagram of a possible logical structure of the first device in the foregoing embodiments. The first device includes a processing module 112 and a communications module 113. The processing module 112 is configured to control and manage an action of the first device. For example, the processing module 112 is configured to perform a step of processing a message or data at the first device side, for example, support the first device in performing steps S106, S1063, and S1065 in the foregoing embodiment. The communications module 113 is configured to support the first device in performing steps S101, S1011, S1012, S1061, S1062, S1064, S108, and S110 in the foregoing embodiment, and/or another process performed by the first device by using the technology described in this specification. The first device may further include a storage module 111, configured to store program code and data of the first device.

The processing module 112 may be a processor or a controller. For example, the processing module may be a central processing unit, a general-purpose processor, a digital signal processor, an application-specific integrated circuit, a field programmable gate array or another programmable logical device, a transistor logical device, a hardware component, or any combination thereof. The processing module may implement or execute various example logical blocks, modules, and circuits described with reference to the content disclosed in the present invention. Alternatively, the processor may be a combination of processors implementing a computing function, for example, a combination of one or more microprocessors, or a combination of the digital signal processor and a microprocessor. The communications module 113 may be a transceiver, a transceiver circuit, a communications interface, or the like. The storage module 111 may be a memory.

Figure 14:
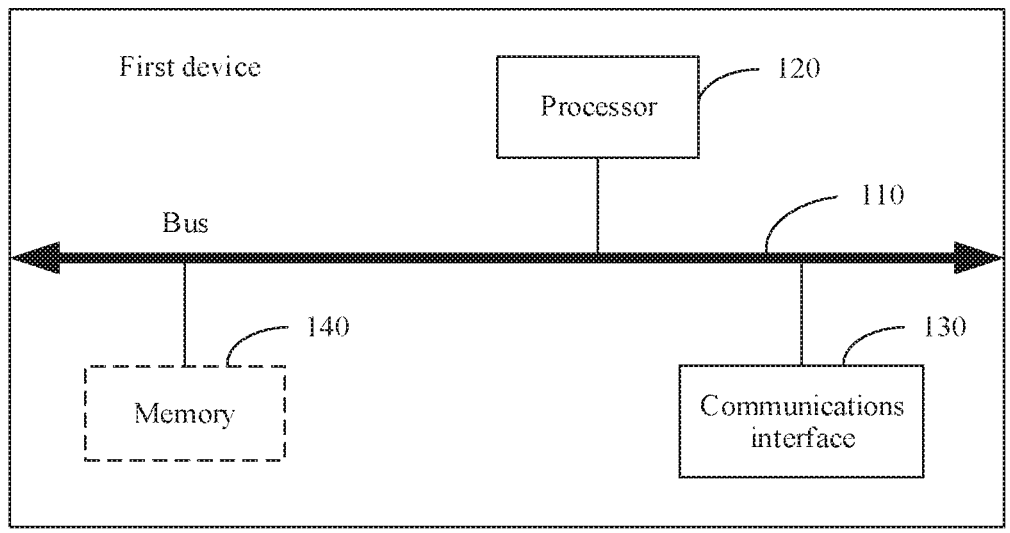
FIG. 14 is a schematic structural diagram 3 of a first device according to this application.

When the processing module 112 is a processor 120, the communications module 113 is a communications interface 130 or a transceiver, and the storage module 111 is a memory 140, the first device in this embodiment of this application may be a device shown in FIG. 14.

The communications interface 130, at least one processor 120, and the memory 140 are connected to each other by using a bus 110. The bus 110 may be a PCI bus, an EISA bus, or the like. The bus may be classified into an address bus, a data bus, a control bus, and the like. For ease of representation, only one thick line is used to represent the bus in FIG. 14, but this does not mean that there is only one bus or only one type of bus. The memory 140 is configured to store program code and data of the first device. The communications interface 130 is configured to support the first device in communicating with another device (for example, an access device). The processor 120 is configured to support the first device in executing the program code and the data that are stored in the memory 140, to implement the method for reporting a data volume report provided in the embodiments of this application.

Figure 15:
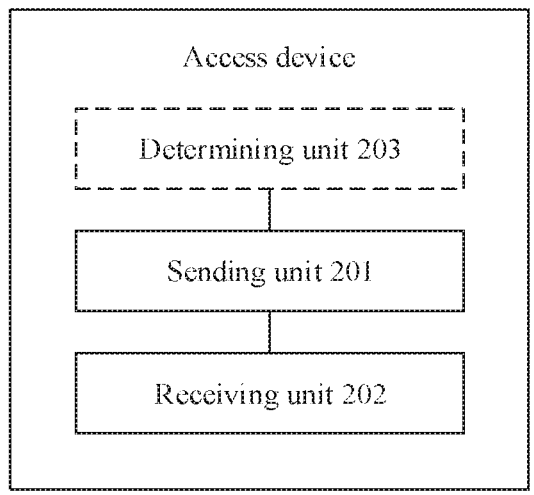
FIG. 15 is a schematic structural diagram 1 of an access device according to this application.

When an integrated unit is used, FIG. 15 is a schematic diagram of a possible structure of the access device in the foregoing embodiments. The access device includes a sending unit 201 and a receiving unit 202. The sending unit 201 is configured to support the access device in performing steps S103, S109, S107, and S109 in the foregoing embodiment. The receiving unit 202 is configured to support the access device in performing step S102 in the foregoing embodiment. In addition, the access device further includes a determining unit 203, configured to support the access device in performing step S105 in the foregoing embodiment and/or another process by using the technology described in this specification. All related content of the steps in the foregoing method embodiment may be cited in the function descriptions of the corresponding function modules. Details are not described herein again.

Based on hardware implementation, the receiving unit 202 in this embodiment of this application may be a receiver of the access device, the sending unit 201 may be a transmitter of the access device, and the transmitter may be usually integrated with the receiver of the access device to serve as a transceiver. A specific transceiver may also be referred to as a communications interface or a transceiver circuit. In addition, the determining unit 203 may be integrated into a processor of the access device.

Figure 16:
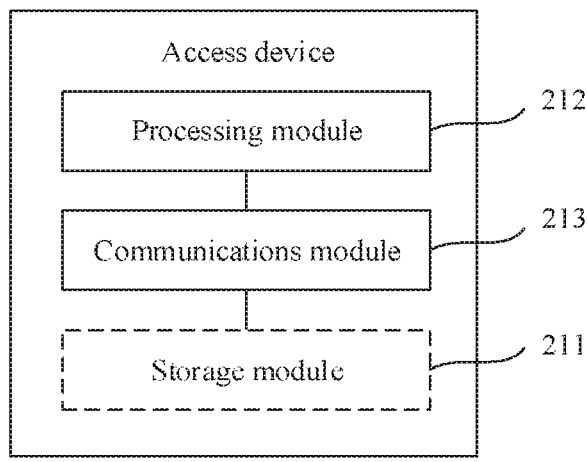
FIG. 16 is a schematic structural diagram 2 of an access device according to this application.

When an integrated unit is used, FIG. 16 is a schematic diagram of a possible logical structure of the access device in the foregoing embodiments. The access device includes a processing module 212 and a communications module 213. The processing module 212 is configured to control and manage an action of the access device. For example, the processing module 212 is configured to support the access device in performing an operation of processing a message or data at the access device side in the foregoing embodiments, for example, performing step S105 in the foregoing embodiment. The communications module 213 is configured to support the access device in performing an operation of receiving and sending a message or data at the access device side in the foregoing embodiments, for example, performing steps S103, S109, S107, S109, and S102 in the foregoing embodiment and/or another process performed by the access device by using the technology described in this specification.

Optionally, the access device may further include a storage module 211, configured to store program code and data of the access device.

The processing module 212 may be a processor or controller. For example, the processing module 212 may be a central processing unit, a general-purpose processor, a digital signal processor, an application-specific integrated circuit, a field programmable gate array or another programmable logical device, a transistor logical device, a hardware component, or any combination thereof. The processing module may implement or execute various example logical blocks, modules, and circuits described with reference to the content disclosed in the present invention. Alternatively, the processor may be a combination of processors implementing a computing function, for example, a combination of one or more microprocessors, or a combination of the digital signal processor and a microprocessor. The communications module 213 may be a transceiver, a transceiver circuit, a communications interface, or the like. The storage module 211 may be a memory.

Figure 17:
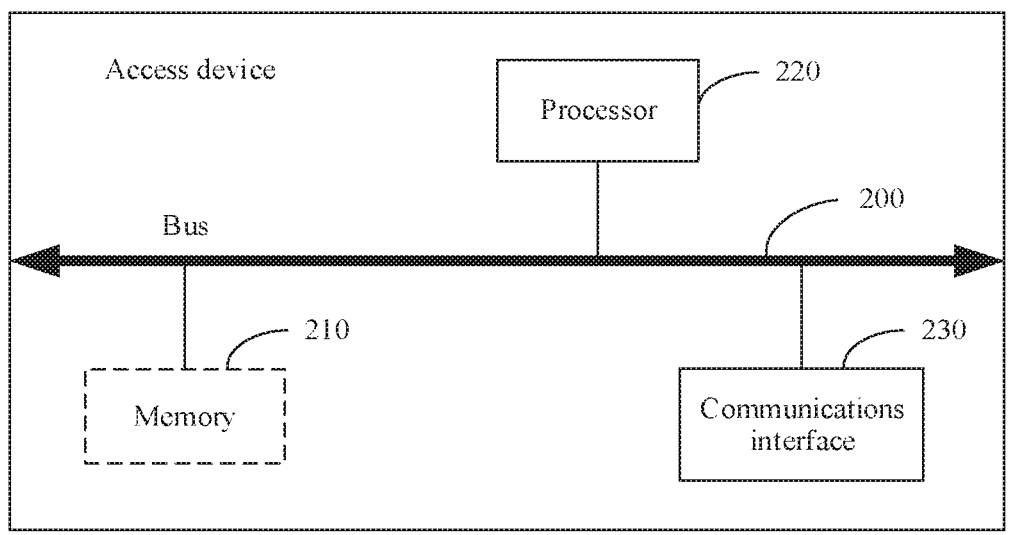
FIG. 17 is a schematic structural diagram 3 of an access device according to this application.

When the processing module 212 is a processor 220, the communications module 213 is a communications interface 230 or a transceiver, and the storage module 211 is a memory 210, the access device in the embodiments of this application may be a device shown in FIG. 17.

The communications interface 230, at least one processor 220, and the memory 210 are connected to each other by using a bus 200. The bus 200 may be a PCI bus, an EISA bus, or the like. The bus may be classified into an address bus, a data bus, a control bus, and the like. For ease of representation, only one thick line is used to represent the bus in FIG. 17, but this does not mean that there is only one bus or only one type of bus. The memory 210 is configured to store program code and data of the access device. The communications interface 230 is configured to support the access device in communicating with another device (for example, a terminal). The processor 220 is configured to support the access device in executing the program code and the data that are stored in the memory 210, to implement the method for reporting a data volume report provided in the embodiments of this application.

The foregoing receiving unit (or a unit used for receiving) is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing sending unit (or a unit used for sending) is an interface circuit of the apparatus, and is configured to send a signal to another apparatus. For example, when the apparatus is implemented in a manner of a chip, the sending unit is an interface circuit that is of the chip and that is configured to send a signal to another chip or apparatus.

It should be noted that, because a device S may be an access device for a next-hop device of the device S, and may be a first device for a previous-hop device of the device S, the device S may have all functions of the access device and the first device.

Figure 18:
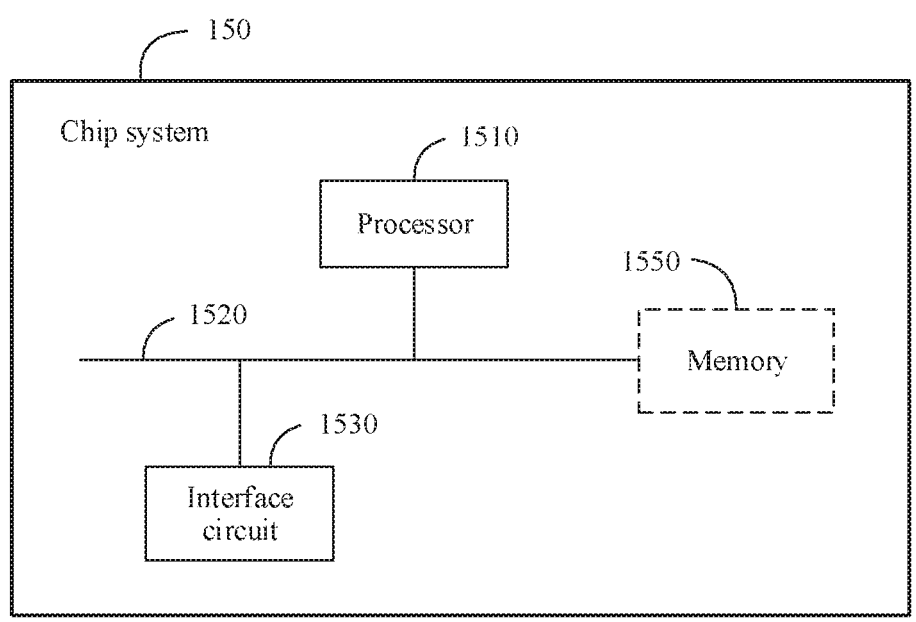
FIG. 18 is a schematic structural diagram of a chip system according to this application.

FIG. 18 is a schematic structural diagram of a chip system 150 according to an embodiment of the present invention. The chip system 150 includes at least one processor 1510 and an interface circuit 1530.

Optionally, the chip system 150 further includes a memory 1550. The memory 1550 may include a read-only memory and a random access memory, and provides an operation instruction and data for the processor 1510. A part of the memory 1550 may further include a non-volatile random access memory (NVRAM).

In some implementations, the memory 1550 stores the following elements: an executable module or a data structure, or a subset thereof, or an extended set thereof.

In this embodiment of the present invention, a corresponding operation is performed by invoking the operation instruction stored in the memory 1550 (where the operation instruction may be stored in an operating system).

In a possible implementation, a structure of a chip system used by the first device is similar to a structure of a chip system used by the access device, and different apparatuses may use different chip systems to implement respective functions.

The processor 1510 controls operations of the first device and the access device, and the processor 1510 may also be referred to as a CPU (central processing unit). The memory 1550 may include a read-only memory and a random access memory, and provide an instruction and data to the processor 1510. A part of the memory 1550 may further include a non-volatile random access memory (NVRAM). In a specific application, the memory 1550, the interface circuit 1530, and the memory 1550 are coupled together by using a bus system 1520. The bus system 1520 may further include a power supply bus, a control bus, a status signal bus, and the like in addition to a data bus. However, for clear description, various types of buses in FIG. 18 are marked as the bus system 1520.

The method disclosed in the foregoing embodiments of the present invention may be applied to the processor 1510, or implemented by the processor 1510. The processor 1510 may be an integrated circuit chip and has a signal processing capability. In an implementation process, steps in the foregoing methods can be implemented by using a hardware integrated logical circuit in the processor 1510, or by using instructions in a form of software. The processor 1510 may be a general purpose processor, a digital signal processor (DSP), an application-specific integrated circuit (ASIC), a field programmable gate array (FPGA) or another programmable logic device, a discrete gate or a transistor logic device, or a discrete hardware component, to implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and completed by using a hardware decoding processor, or may be executed and completed by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1550, and a processor 1510 reads information in the memory 1550 and completes the steps in the foregoing methods in combination with hardware of the processor.

Optionally, the interface circuit 1530 is configured to perform receiving and sending steps of the first device and the access device in the embodiments shown in FIG. 7, FIG. 9, and FIG. 10.

The processor 1510 is configured to perform processing steps of the first device and the access device in the embodiments shown in FIG. 7, FIG. 9, and FIG. 10.

In the foregoing embodiments, the instruction that is stored in the memory and that is to be executed by the processor may be implemented in a form of a computer program product. The computer program product may be written in the memory in advance, or may be downloaded and installed in the memory in a form of software.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium by a computer for storage, or a data storage device including a server, a data center, or the like that is integrated by one or more usable media. The usable medium may be a magnetic medium (for example, a floppy disk, a hard disk, or a magnetic tape), an optical medium (for example, a DVD), a semiconductor medium (for example, a solid-state drive Solid State Disk, SSD), or the like.

According to one aspect, a computer storage medium is provided. The computer-readable storage medium stores an instruction, and when the instruction is run, a first device is enabled to perform S106, S1063, S1065, S101, S1011, S1012, S1061, S1062, S1064, S108, and S110 in the embodiments and/or another process performed by the first device by using the technology described in this specification.

According to still another aspect, a computer storage medium is provided. The computer-readable storage medium stores an instruction, and when the instruction is run, an access device is enabled to perform steps S102, S103, S105, S109, S107, and S109 in the embodiment, and/or another process performed by the access device by using the technology described in this specification.

According to one aspect, a computer program product including an instruction is provided. The computer program product stores an instruction, and when the instruction is run, a first device is enabled to perform S106, S1063, S1065, S101, S1011, S1012, S1061, S1062, S1064, S108, and S110 in the embodiment and/or another process performed by the first device by using the technology described in this specification.

According to still another aspect, a computer program product including an instruction is provided. The computer program product stores an instruction, and when the instruction is run, an access device is enabled to perform S102, S103, S105, S109, S107, and S109 in the embodiment and/or another process performed by the access device by using the technology described in this specification.

According to one aspect, a chip system is provided. The chip system is applied to a first device, and includes at least one processor and an interface circuit. The interface circuit and the at least one processor are interconnected by using a line. The processor is configured to run an instruction, to perform S106, S1063, S1065, S101, S1011, S1012, S1061, S1062, S1064, S108, and S110 in the embodiment and/or another process performed by the first device by using the technology described in this specification.

According to still another aspect, a chip system is provided. The chip system is applied to an access device, and includes at least one processor and an interface circuit. The interface circuit and the at least one processor are interconnected by using a line. The processor is configured to run an instruction, to perform steps S102, S103, S105, S109, S107, and S109 in the embodiments, and/or another process performed by the access device by using the technology described in this specification.

In addition, an embodiment of this application further provides a relay system. The relay system includes the first device shown in FIG. 12 to FIG. 14, and the access device shown in FIG. 15 to FIG. 17.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

Units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in various embodiments of the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions in the embodiments of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of this application. Therefore, the protection scope of this application shall be subject to the protection scope of the claims.

What is claimed is:

1. A method for sending a data volume report, applied to a relay system, and comprising:
    determining, by a first device, an uplink data volume corresponding to each of a plurality of quality of service flows or requirements of the plurality of quality of service flows based on a mapping relationship between the plurality of quality of service flows and a plurality of data radio bearers (DRBs), and a mapping relationship between the plurality of DRBs and a plurality of logic channels or a plurality of logical channel groups, wherein the first device has a mapping relationship between a plurality of logical channel groups allocated by a relay device located at a next-hop of the first device to a terminal device and a plurality of logical channel groups allocated by the first device to the relay device; and
    transmitting, by the first device, a first data volume report comprising the uplink data volume to a first access device when a condition for reporting a data volume is satisfied, wherein the first data volume report indicates a first uplink data volume transmitted from the first device and a second uplink data volume transmitted from a second device and received by the first device, and the condition comprises any one or more of: (1) a sub-condition that at least one of the first uplink data volume or the second uplink data volume is greater than or equal to a predetermined threshold; (2) a time period that the sub-condition is satisfied is greater than or equal to a predetermined time threshold; (3) an instruction instructing the first device to report at least one of the first uplink data volume or a data volume transmitted from the second device; (4) at least one of a plurality of connections between the first device and the first access device is disconnected; or (5) a connection between the first device and a second access device is disconnected.

2. The method according to claim 1, further comprising:
    before the first data volume report is transmitted, transmitting, by the first device, a first request message to a third device, wherein the first request message instructs the third device to report at least one of a third uplink data volume transmitted from the third device or a fourth uplink data volume transmitted from a fourth device determined by the third device;
    receiving, by the first device, a second data volume report from the third device, wherein the second data volume report comprises at least one of the third uplink data volume or the fourth uplink data volume; and
    determining, by the first device, the first data volume report based on at least one of the second data volume report or the first uplink data volume.

3. The method according to claim 1, further comprising:
    receiving, by the first device, a second data volume report from a third device, wherein the second data volume report instructs the first device to report at least one of the first uplink data volume or the data volume transmitted from the second device; and
    determining, by the first device, the first data volume report based on at least one of the second data volume report or the first uplink data volume.

4. The method according to claim 1, wherein the first data volume report has highest sending priority compared to other data volume reports.

5. The method according to claim 1, further comprising:
    receiving, by the first device and from the first access device, a message for determining a proportion of a data volume sent to the first access device in a data volume to be reported by the first device.

6. The method according to claim 1, further comprising:
receiving, by the first device, a proportional relationship sent by the first access device, wherein the proportional relationship indicates a proportion of a data volume sent by the first device to the first access device in a data volume to be reported by the first device, and a proportion of a data volume sent by the first device to the second access device in the data volume to be reported by the first device.

7. The method according to claim 1, further comprising:
receiving, by the first device and from the first access device, a message for determining a proportion of a data volume sent on each of the plurality of connections in the data volume to be reported by the first device.

8. A first device in a relay system, comprising a non-transitory computer-readable storage medium storing instructions; and at least one processor; wherein the instructions are executable by the at least one processor to cause the first device to perform operations comprising:
determining an uplink data volume corresponding to each of a plurality of quality of service flows or requirements of the plurality of quality of service flows based on a mapping relationship between the plurality of quality of service flows and a plurality of data radio bearers (DRBs), and a mapping relationship between the plurality of DRBs and a plurality of logic channels or a plurality of logical channel groups, wherein the first device has a mapping relationship between a plurality of logical channel groups allocated by a relay device located at a next-hop of the first device to a terminal device and a plurality of logical channel groups allocated by the first device to the relay device; and
transmitting, a first data volume report comprising the uplink data volume to a first access device when a condition for reporting a data volume is satisfied, wherein the first data volume report indicates a first uplink data volume transmitted from the first device and a second uplink data volume transmitted from a second device and received by the first device, and the condition comprises any one or more of: (1) a sub-condition that at least one of the first uplink data volume or the second uplink data volume is greater than or equal to a predetermined threshold; (2) a time period that the sub-condition is satisfied is greater than or equal to a predetermined time threshold; (3) an instruction instructing the first device to report at least one of the first uplink data volume or a data volume transmitted from the second device; (4) at least one of a plurality of connections between the first device and the first access device is disconnected; or (5) a connection between the first device and a second access device is disconnected.

9. The first device according to claim 8, further comprising:
before the first data volume report is transmitted, transmitting a first request message to a third device, wherein the first request message instructs the third device to report at least one of a third uplink data volume transmitted from the third device or a fourth uplink data volume transmitted from a fourth device determined by the third device;
receiving a second data volume report from the third device, wherein the second data volume report comprises at least one of the third uplink data volume or the fourth uplink data volume; and
determining the first data volume report based on at least one of the second data volume report or the first uplink data volume.

10. The first device according to claim 8, further comprising:
receiving a second data volume report from a third device, wherein the second data volume report instructs the first device to report at least one of the first uplink data volume or the data volume transmitted from the second device; and
determining the first data volume report based on at least one of the second data volume report or the first uplink data volume.

11. The first device according to claim 8, wherein the first data volume report has highest sending priority compared to other data volume reports.

12. The first device according to claim 8, further comprising:
receiving, from the first access device, a message for determining a proportion of a data volume sent to the first access device in a data volume to be reported by the first device.

13. The first device according to claim 8, further comprising:
receiving a proportional relationship sent by the first access device, wherein the proportional relationship indicates a proportion of a data volume sent by the first device to the first access device in a data volume to be reported by the first device, and a proportion of a data volume sent by the first device to the second access device in the data volume to be reported by the first device.

14. The first device according to claim 8, further comprising:
receiving, from the first access device, a message for determining a proportion of a data volume sent on each of the plurality of connections in the data volume to be reported by the first device.

* * * * *